United States Patent
Yonezawa

(10) Patent No.: US 6,744,702 B2
(45) Date of Patent: Jun. 1, 2004

(54) APPARATUS FOR ACCESSING RECORDING DISK BY CONTROLLING THE COARSE AND PRECISE ACTUATORS

(75) Inventor: Minoru Yonezawa, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 09/956,017

(22) Filed: Sep. 20, 2001

(65) Prior Publication Data

US 2002/0039329 A1 Apr. 4, 2002

(30) Foreign Application Priority Data

Sep. 29, 2000 (JP) ....................................... 2000-301472

(51) Int. Cl.⁷ ............................................. G11B 21/08
(52) U.S. Cl. ................................. 369/30.17; 369/30.15
(58) Field of Search ............................ 369/30.17, 30.1, 369/30.11, 30.13, 30.12, 30.14, 30.15, 30.18, 44.28, 44.27, 44.29, 44.31; 360/78.04, 78.06, 78.05, 77.02

(56) References Cited

U.S. PATENT DOCUMENTS

| | | | |
|---|---|---|---|
| 4,907,109 A | * 3/1990 | Senio | ....................... 360/78.04 |
| 5,033,037 A | 7/1991 | Yanagi | |
| 5,056,072 A | * 10/1991 | Wachi | ....................... 369/30.13 |
| 5,063,549 A | * 11/1991 | Yamamuro | ................... 369/30.17 |
| 5,301,174 A | * 4/1994 | Matoba et al. | ............. 369/30.17 |
| 5,566,148 A | * 10/1996 | Takahara et al. | .......... 369/30.16 |
| 5,604,722 A | * 2/1997 | Suzuki | ...................... 369/30.17 |

* cited by examiner

*Primary Examiner*—Tan Dinh
(74) *Attorney, Agent, or Firm*—Oblon, Spivak, McClelland, Maier & Neustadt, P.C.

(57) ABSTRACT

A disk apparatus comprising a precise positioning mechanism for finely displacing the information recording/reproducing mechanism in a radial direction of the disk, a coarse positioning mechanism for positionally displacing the information recording/reproducing mechanism in an information recording region in the radial direction of the disk, a coarse positioning mechanism driving circuit for controlling the drive of the coarse positioning mechanism upon receiving the drive signal in accordance with the drive signal generated by the reference speed generator, and a precise positioning mechanism driving circuit for controlling the drive of the precise positioning mechanism in accordance with a difference between the moving speed detected by the speed detector and the reference speed generated by the reference speed generator.

15 Claims, 15 Drawing Sheets

APPARATUS FOR ACCESSING RECORDING DISK BY CONTROLLING THE COARSE AND PRECISE ACTUATORS

CROSS-REFERENCE TO RELATED APPLICATIONS

This application is based upon and claims the benefit of priority from the prior Japanese Patent Application No. 2000-301472, filed Sep. 29, 2000, the entire contents of which are incorporated herein by reference.

BACKGROUND OF THE INVENTION

The present invention relates to a disk apparatus for performing recording/reproduction on a disk having information recording tracks, more specifically, it relates to a method of access control of a disk apparatus that performs positioning on a target track with use of two actuators: coarse and precise actuators.

In the field of optical disks, represented by DVDS, a disk having a diameter of 120 mm and a recording capacity of 4.7 GB has been brought into practical use in recent years. It is also expected that a disk having a recording capacity 3–4 times larger than that of this disk will be developed for practical use several years later. In order to cope with the increase in the recording density in the disk due to the increase in the recording capacity, more specifically, with the reduction of a track pitch, the servo precision having more precise positioning performance is now required for a disk recording/reproducing drive.

In fact, the highly precise positioning technique is essential for an optical disk apparatus to realize positioning of an optical spot in the direction of the diameter of a disk in the order of several nm on information recording tracks each having a pitch of 1 $\mu$m or less. On the other hand, the access speed is also an important factor of the performance of the disk drive. A disk apparatus thus needs an access control technique capable of positioning, satisfying both the demands of high-speed and high precision.

Generally, in order to cover the diameter of a disk and realize highly precise positioning, the positioning of the optical spot is performed with two actuators, i.e., coarse and precise actuators. Access control, using these two actuators, in order to realize the access with high-speed and high precision, will now be described.

These two actuators, however, have some limitations.

The limitation of the precise actuator is that in displacement amount. In accordance with the increase of the optical disk in density, the requirements of the specification of optical elements used for the optical disk apparatus are becoming stricter. For example, the shift of an objective lens from the optical axis is required to be 50 $\mu$m or less for a 4.7 GB DVD disk. If the shift is larger, the optical aberration becomes larger, and the recording/reproduction of information or detection of a positioning signal is adversely affected. A biaxial actuator is used as a precise actuator for positioning an objective lens, and has a limitation in the displacement amount.

The limitation of the coarse actuator is poor positioning precision. The coarse actuator is intended to coarsely position the objective lens in the direction of the radius of a disk. To cope with the requirement for reduction of manufacturing cost, the coarse actuator is formed of low-cost components: a sliding bearing and a low-cost positioning motor. Similarly, a driving force transmission mechanism is subject to many non-linear factors, such as friction and backlash. The positioning precision of the coarse actuator is as poor as 100 $\mu$m.

It is now required for the optical disk apparatus to perform the positioning satisfying both high-speed and high precision with use of the two actuators without large displacement of the precise actuator. Some access control methods have been proposed to overcome the above-mentioned limitations by suitably making the two actuators cooperate with each other.

The conventional access control methods by the cooperation of the precise and coarse actuators will be described below in conjunction with the block diagrams of FIGS. 2 and 8. The constitution shown in these diagrams comprises a feed motor (a coarse actuator) 107 for moving an optical head 103, and an objective lens actuator (a precise actuator) 106 for positioning only an objective lens 102, in order to position the optical spot on a disk 101.

The access control according to the above-mentioned apparatus is performed with use of reflected light from the disk 101 after canceling the tracking control shown in FIG. 8.

In the tracking state, a track traversing signal generated when the optical spot traverses a track on the disk 101 is detected by a light detector 105 and a comparison processing circuit 108. The track traversing signal is input into a precise positioning mechanism controlling compensator 402 and then input into a precise positioning mechanism 106 via an amplifier 13 and a precise positioning mechanism driving circuit 15. The precise positioning mechanism 106 is controlled so as to move the optical spot to the same track. The track traversing signal is also supplied to a coarse positioning mechanism controlling compensator 403 and then input into a coarse positioning mechanism 107 via an amplifier 16 and a coarse positioning mechanism driving circuit 19. Similarly to the precise positioning mechanism 106, the coarse positioning mechanism 107 is controlled so as to move the optical spot to the same track.

Simultaneously to the staring the access, the tracking state is switched to the control state controlled by the control system constituted as shown in the block diagram of FIG. 2. In the access control by the control system, the light detector 105 detects the track traversing signal (the tracking error signal). A counter 110 counts the number of traversed tracks on the basis of the track traversing signal. A reference speed generator 111 generates a target speed (a reference speed) based on the number of the remaining tracks.

On the other hand, a speed detector 114 binarizes the track traversing signal to generate a track count pulse, then divides a track pitch by an interval of the track count pulses to obtain a relative moving speed on the tracks. A gain compensator 113 compensates the difference between the relative moving speed and the reference speed by amplification to output a drive signal to the feed motor 107 as the coarse actuator.

According to the conventional method, the access control by the speed control is performed at first, wherein the difference between the relative moving speed and the reference speed is fed back to the feed motor 107 until the detected relative moving speed equals the reference speed. It is found that the detected relative moving speed equals the reference speed when the output of the gain compensator 113, which indicates the difference thereof, becomes 0. When the detected relative moving speed equals the reference speed, a control circuit 119 switches Sw1 and Sw2.

After switching Sw1 and Sw2, the objective lens actuator 106 is controlled by the difference between the relative moving speed and the reference speed, and the feed motor 107 is controlled by the output from a displacement sensor 104 for detecting the amount of shift of the objective lens 102 from the optical axis.

The objective lens actuator 106 is subjected to the speed control, and the feed motor 107 is controlled so as to move in accordance with the displacement of the objective lens 102. Such a control system is constituted to perform acceleration with the maximum capacity in high-speed access in order to shorten the access time, and in low-speed access, to control the coarse and precise actuators so as to cooperate for attaining the precise access.

The above-mentioned constitution, however, essentially needs an expensive sensor for actually detecting the relative displacement of the objective lens, and thus the reduction in the manufacturing cost cannot be attained. In addition, the feed motor and the driving force transmission mechanism is subject to non-linear factors and delay factors such as friction, as described above, and it thus may frequently occur that the displacement of the actuator may not actually attained with use of fine output from the sensor. The access speed may be decreased, at the same time. Further, the non-linear elements of the driving force transmission mechanism may adversely affect the start of access at which the tracking state is transferred to the access state, with the result that some problems occur in which the feed motor does not displace at the start of access.

In general, the objective lens actuator has a higher drive sensitivity and higher response frequency than those of the feed motor. Therefore, in the case where the feed motor is controlled to move in accordance with the movement of the objective lens actuator, it cannot be prevented that the feed motor displaces with a low speed after a considerable period of time during which the objective lens actuator has made a large displacement. The large displacement of the objective lens actuator results in large shifts of the objective lens from the optical axis, and a deterioration of the optical signal.

With the conventional access control method, the feed motor is controlled to move in accordance with the movement of the objective lens actuator in consideration of the above-mentioned limitations of the actuators. However, the response speed of the feed motor is so low that a large shift of the objective lens will inevitably occur.

To sum up, it is difficult with the conventional constitution of the optical disk apparatus to overcome the limitations of the actuators. There is concern that this problem will be more serious in future optical disk apparatus used for higher density disks.

BRIEF SUMMARY OF THE INVENTION

The present invention is developed to solve the above-mentioned problems, and intended to provide a disk apparatus capable of precise and stabilized access and seek control with high speed without increasing the manufacturing cost.

According to the aspects of the present invention, a disk apparatus comprising: information recording/reproducing mechanism which records/reproduces information on a disk having a plurality of information tracks; a precise positioning mechanism which finely displaces the information recording/reproducing mechanism in a radial direction of the disk; a coarse positioning mechanism which positionally displaces the information recording/reproducing mechanism in an entire information recording region in the radial direction of the disk; a speed detector which detects a moving speed of the information recording/reproducing mechanism in the radial direction of the disk in accordance with a signal reproduced by the information recording/reproducing mechanism; a displacement calculator which detects a moving distance of the information recording/reproducing mechanism in the radial direction of the disk in accordance with a signal reproduced by the information recording/reproducing mechanism; a reference speed generator which generates a reference speed used for controlling the drive of the precise positioning mechanism in accordance with the displacement calculated by the displacement calculator; a drive signal generator which generates a drive signal for driving the coarse positioning mechanism in accordance with the displacement calculated by the displacement calculator; a coarse positioning mechanism driving circuit which controls the drive of the coarse positioning mechanism in accordance with the drive signal generated by the drive signal generator; and a precise positioning mechanism driving circuit which controls the drive of the precise positioning mechanism in accordance with a difference between the moving speed detected by the speed detector and the reference speed generated by the reference speed generator.

DETAILED DESCRIPTION OF THE INVENTION

The disk apparatus according to the present invention can be more fully understood from the following detailed description of embodiments of the invention in conjunction with the accompanying drawings.

[First Embodiment]

Figure 1:
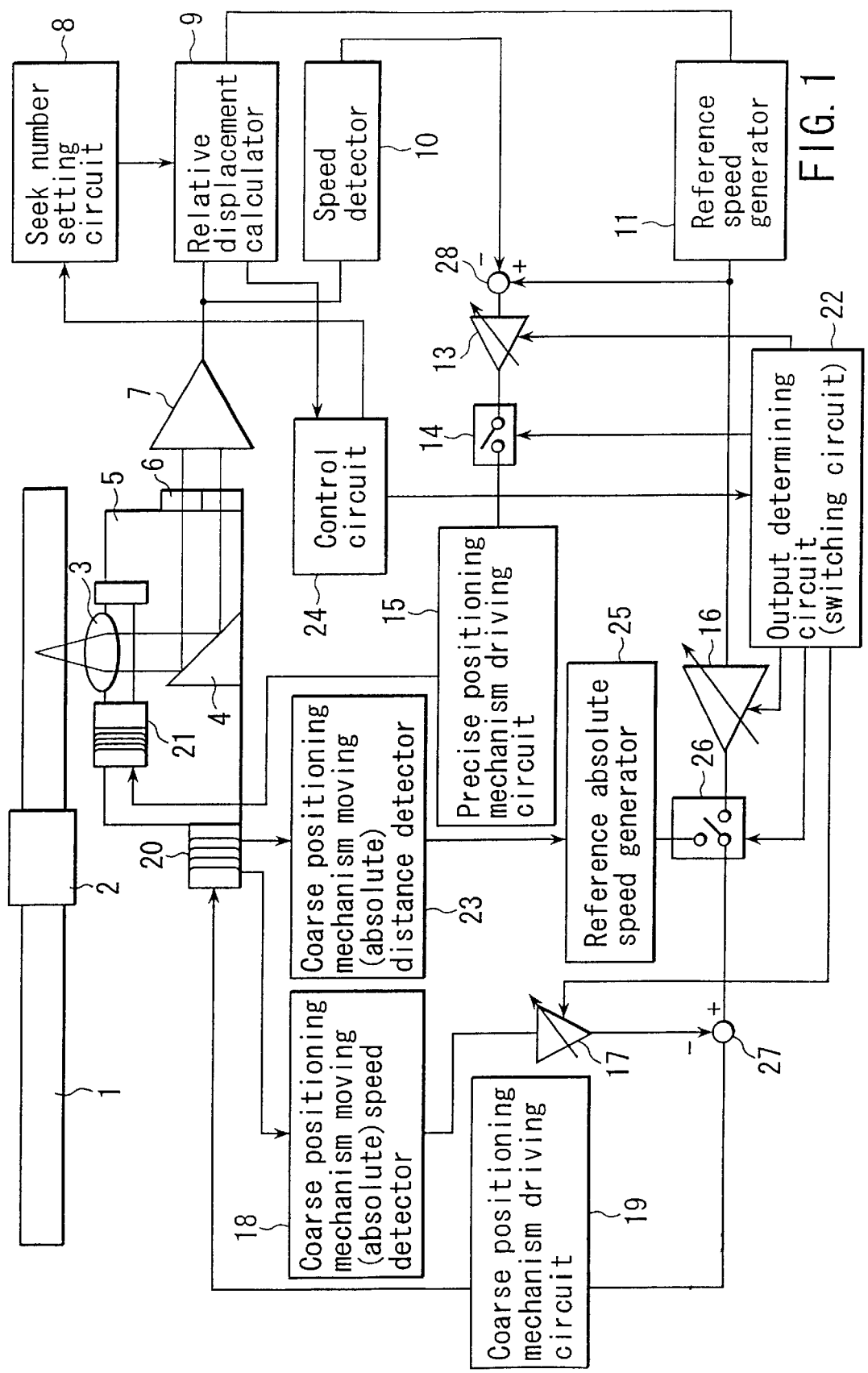
FIG. 1 is a block diagram showing an example of the constitution of the control system of an optical disk apparatus according to the first embodiment of the present invention.
Figure 2:
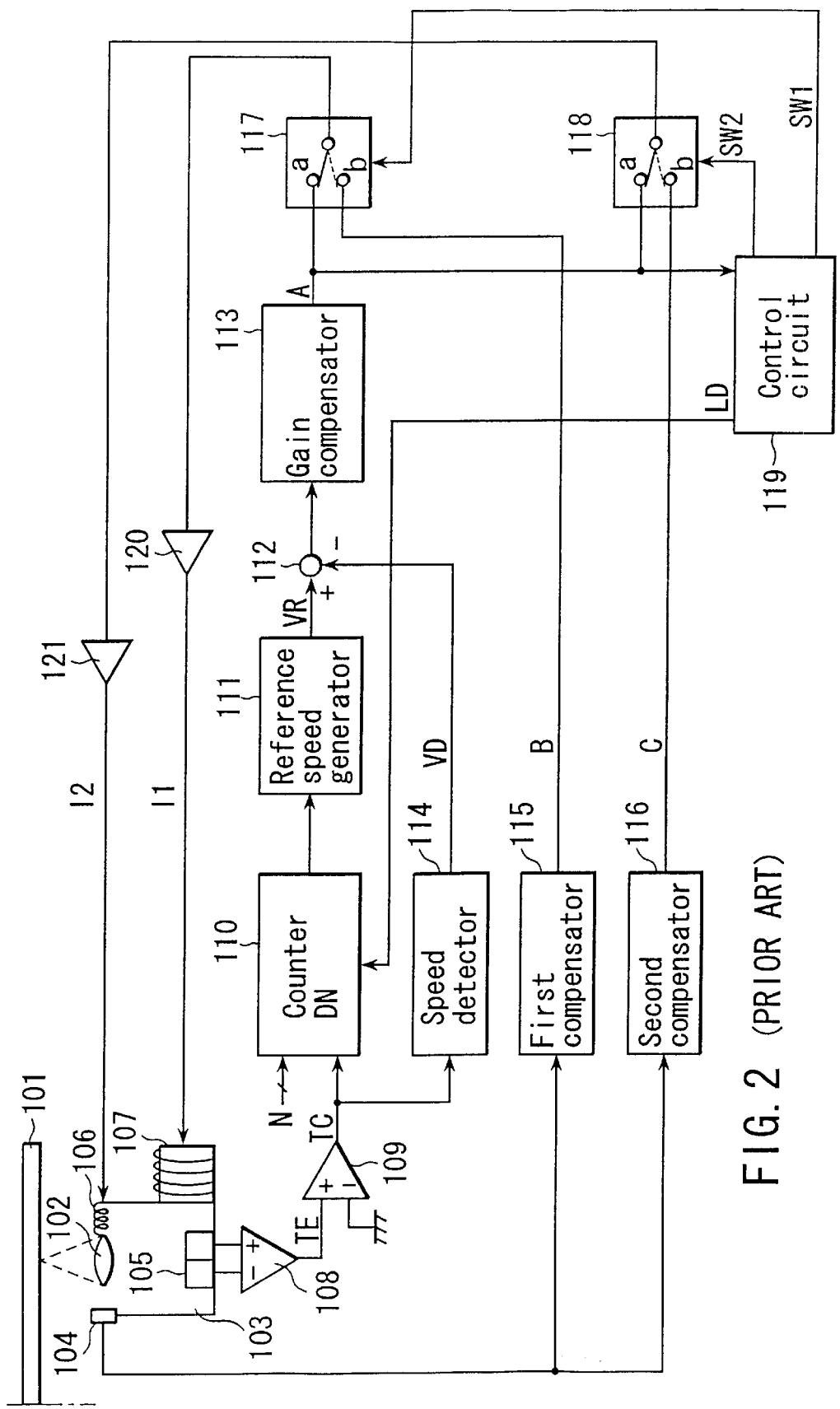
FIG. 2 is a block diagram showing an example of the constitution of the control system of the conventional optical disk apparatus.
Figure 3:
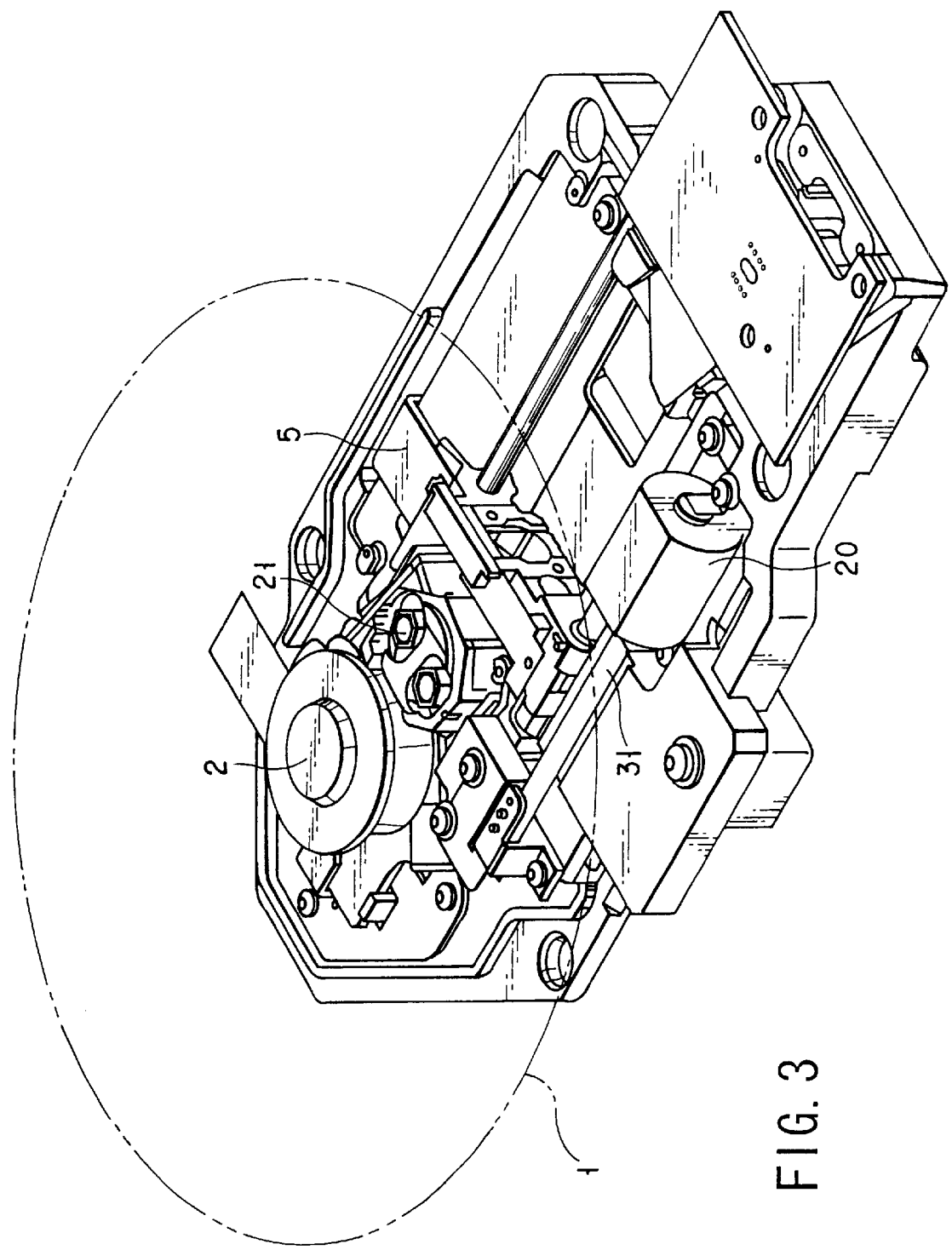
FIG. 3 is a schematic view showing an example of the constitution of the optical disk apparatus shown in FIG. 1.
Figure 9:
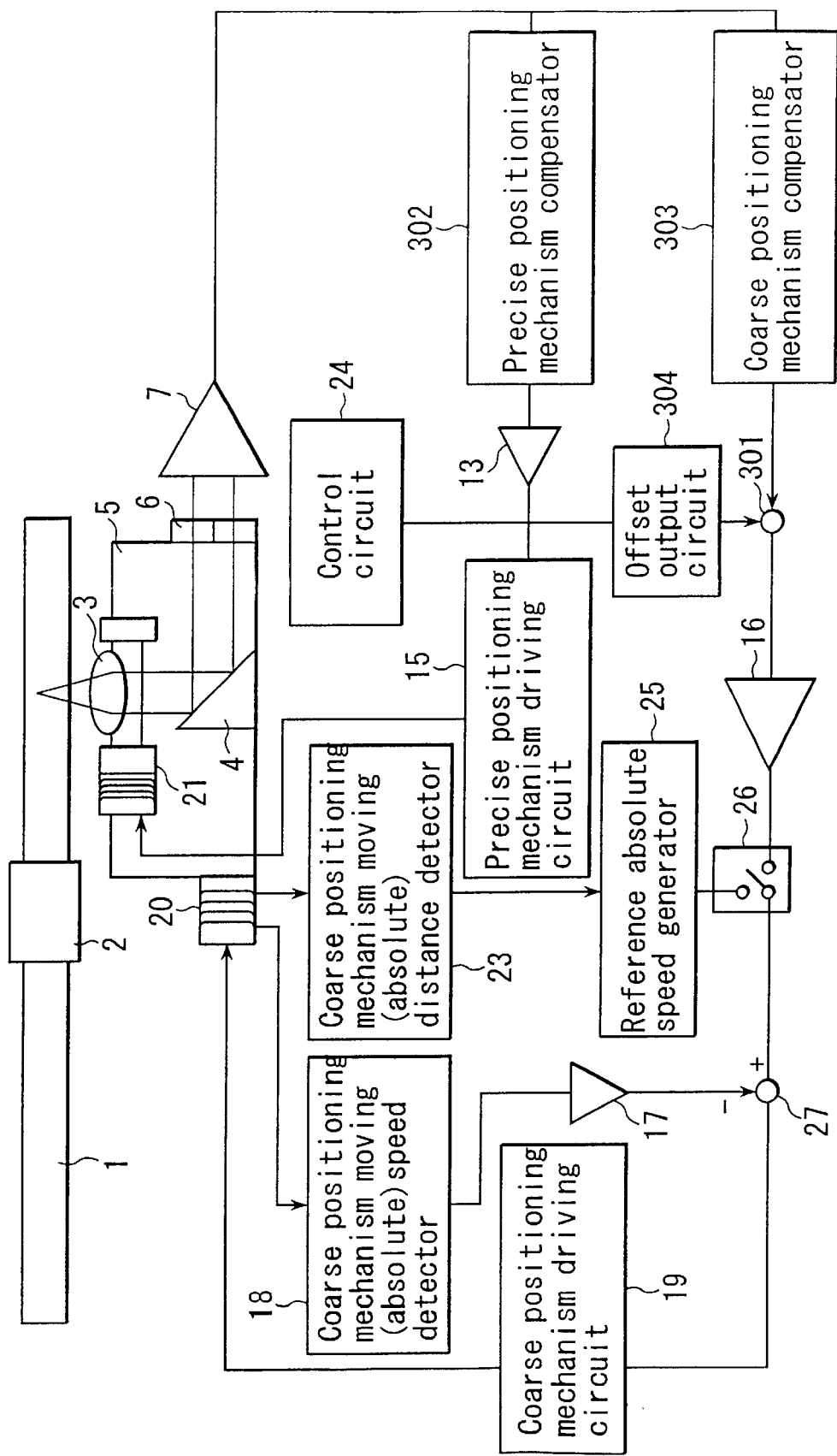
FIG. 9 is a block diagram showing the main elements of the tracking control system of the optical disk apparatus according to the first embodiment of the present invention.

FIG. 1 is a block diagram showing the main elements of the access control system of the disk apparatus according to the first embodiment of the present invention, which is used in the access control system of an optical disk apparatus. FIG. 3 is a schematic view of the optical disk apparatus according to the first embodiment of the present invention. FIG. 9 is a block diagram showing the main elements of the tracking control system of the optical disk apparatus according to the first embodiment of the present invention, which is used in the tracking control system of an optical disk apparatus.

The optical disk apparatus shown in FIGS. 1, 3, and 9 comprises an optical head (information recording/reproducing section) 5, a coarse positioning mechanism 20, and a precise positioning mechanism 21. The optical head 5 forms an optical spot on an optical disk 1, and records/reproduces information on the optical disk 1 having information recording tracks. The coarse positioning mechanism 20 makes the displacement of at least a part of an optical head 5, i.e., the displacement of the optical spot so as to position the optical spot on an entire information recording region in a radial direction of the optical disk. The precise positioning mechanism 21 makes fine displacement of at least a part of the optical head 5, i.e., the fine displacement of the optical spot in a radial direction.

The optical head 5 has an objective lens 3, the precise positioning mechanism 21, a light detector 6, and a reflection mirror 4. The objective lens 3 focuses a beam emitted from a not shown light source on the optical disk 1 rotated by a disk motor 2 at a predetermined rotating speed. The precise positioning mechanism 21 positions the objective lens 3. The light detector 6 receives the beam reflected from the optical disk 1, and outputs an output signal in accordance with the received reflection beam. The reflection mirror 4 reflects the beam emitted from the light source to the objective lens 3, and reflects the reflection beam from the optical disk 1 to the light detector 6.

The output signal output from the light detector 6 is input into a comparison processing circuit (comparator) 7 to generate a reproduction signal (positioning error signal).

As shown in FIG. 9, the optical disk apparatus further comprises a precise positioning mechanism controlling compensator 302, an amplifier 13, a precise positioning mechanism driving circuit 15, a coarse positioning mechanism controlling compensator 303, an amplifier 16, a coarse positioning mechanism driving circuit 19, a control circuit 24, and an offset output circuit 304.

During the tracking operation, a tracking error signal is input into the precise positioning mechanism driving circuit 15 via the amplifier 13 and the precise positioning mechanism controlling compensator 302. The precise positioning mechanism driving circuit 15 drives the precise positioning mechanism 21 such that the light spot is moved to a target track and positioned thereon in accordance with the tracking error signal. The tracking error signal is also supplied to a coarse positioning mechanism driving circuit 19 via a coarse positioning mechanism controlling compensator 303 and an amplifier 16. The coarse positioning mechanism driving circuit 19 drives the coarse positioning mechanism 20 such that the light spot is moved to a target track and positioned thereon in accordance with the tracking error signal. The offset output circuit 304 makes the displacement of the coarse positioning mechanism 20 in the access direction upon receiving instruction from the control circuit 24 to start the access.

Prior to starting the access, the offset output circuit 304 makes the displacement of the coarse positioning mechanism 20 in the access direction in order to offset the influence of the dead zone such as a backlash which may be generated in the tracking state in the access direction. It is preferable for the offset output to be set at as low as several 100 mV so as not to make the tracking state unstable, and to be applied for a predetermined period of time no more than 5 ms as ¼ or less of a disk rotation period so as not to dramatically change the eccentric phase.

The optical disk apparatus switches the tracking state to the control state controlled by the control system constituted as shown in the block diagram of FIG. 1 simultaneously to the staring of the access. The optical disk apparatus further comprises, in the control system the control circuit 24, a seek number setting circuit (moving distance setting circuit) 8, a speed detector 10, a relative displacement calculator 9, and a reference speed generator 11.

The speed detector 10 detects a moving speed of the optical spot in the radial direction of the optical disk on the basis of the reproduction signal generated by a comparator 7. The speed detector 10 detects a moving speed of the optical spot in the radial direction of the optical disk with respect to the number of the traversed tracks on the basis of the track traversing signal generated when the optical spot traverses the information track.

The relative displacement calculator 9 detects a moving distance of the optical spot in the radial direction of the optical disk on the basis of the reproduction signal generated by a comparator 7. The relative displacement calculator 9 detects a moving distance of the optical spot in the radial direction of the optical disk with respect to the number of the traversed tracks on the basis of the track traversing signal generated when the optical spot traverses the information track.

The reference speed generator 11 generates a reference speed based on the moving distance calculated by the relative displacement calculator 9. The reference speed generator 11 also functions as a drive signal generating circuit for generating a drive signal of the coarse positioning mechanism 20 in accordance with the moving distance calculated by the relative displacement calculator 9.

The optical disk apparatus further comprises, in the control system, a coarse positioning mechanism driving circuit 19 and a precise positioning mechanism driving circuit 15. The coarse positioning mechanism driving circuit 19 drives the coarse positioning mechanism 20 on the basis of the drive signal generated by the reference speed generator 11 also functioning as the drive signal generating circuit. The precise positioning mechanism driving circuit 15 drives the precise positioning mechanism 21 in accordance with the difference between the speed detected by the speed detector 10 and the reference moving speed generated by the reference speed generator 11.

The optical disk apparatus further comprises a comparator 28 for comparing the output signal of the speed detector 10 and the output signal of the reference speed generator 11, the precise positioning mechanism amplifier 13 for amplifying the output of the comparator 28 at a predetermined amplifying rate, and a switch 14 for switching the output signal from the precise positioning mechanism amplifier 13 to the input terminal of the precise positioning mechanism driving circuit 15.

The switch 14 inhibits the input of the signal to the precise positioning mechanism driving circuit 15 until the output of the relative displacement calculator 9 reaches a predetermined value. The switch 14 also inhibits the input of the signal to the precise positioning mechanism driving circuit 15 until the output signal of the speed detector 10 reaches a predetermined value.

The optical disk apparatus, as shown in FIG. 1, further comprises a coarse positioning mechanism moving (absolute) speed detector 18 for detecting the moving speed of the optical head 5 along the radial direction of the optical disk, a coarse positioning mechanism moving (absolute) distance detector 23 for detecting the moving distance of the optical head 5 along the radial direction of the optical disk, a reference absolute speed generator 25 for generating the reference absolute speed in accordance with the moving distance detected by the coarse positioning mechanism moving (absolute) distance detector 23.

The optical disk apparatus further comprises a coarse positioning mechanism amplifier 16 for amplifying the output of the reference speed generator 11 at a predetermined amplifying rate, a coarse positioning mechanism moving (absolute) speed amplifier 17 for amplifying the output of the coarse positioning mechanism moving (absolute) speed detector 18 at a predetermined amplifying rate, a switch 26 for switching the output signal from the coarse positioning mechanism amplifier 16 to the input terminal of the coarse positioning mechanism driving circuit 19, a comparator 27 for comparing the output signal of the coarse positioning mechanism moving (absolute) speed amplifier 17 and the output signal input through the switch 26, and an output determining circuit 22.

The output determining circuit 22 changes the gain of the coarse positioning mechanism amplifier 16 in accordance with the predetermined moving distance. The output determining circuit 22 also changes the gain of the precise positioning mechanism amplifier 13 in accordance with the predetermined moving distance. The output determining circuit 22 further changes the gain of the coarse positioning mechanism moving (absolute) speed amplifier 17 in accordance with the predetermined moving distance. The output determining circuit 22 controls the switching of the switches 14 and 26.

The optical disk apparatus shown in FIGS. 1, 3, and 9 employs a DC motor 20 and a feed screw 31 as the coarse positioning mechanism 20. The optical disk apparatus also employs an objective lens actuator 21 as the precise positioning mechanism 21. The DC motor 20 is provided with a motor encoder for detecting a rotating angular speed. The motor encoder functions as the coarse positioning mechanism moving (absolute) distance detector 23, and detects the absolute moving distance of the coarse positioning mechanism 20.

The access control process according to this embodiment starts after preventing the influence of non-linear factors of the coarse positioning mechanism during the tracking operation. The access control process comprises three phases.

Figure 4:
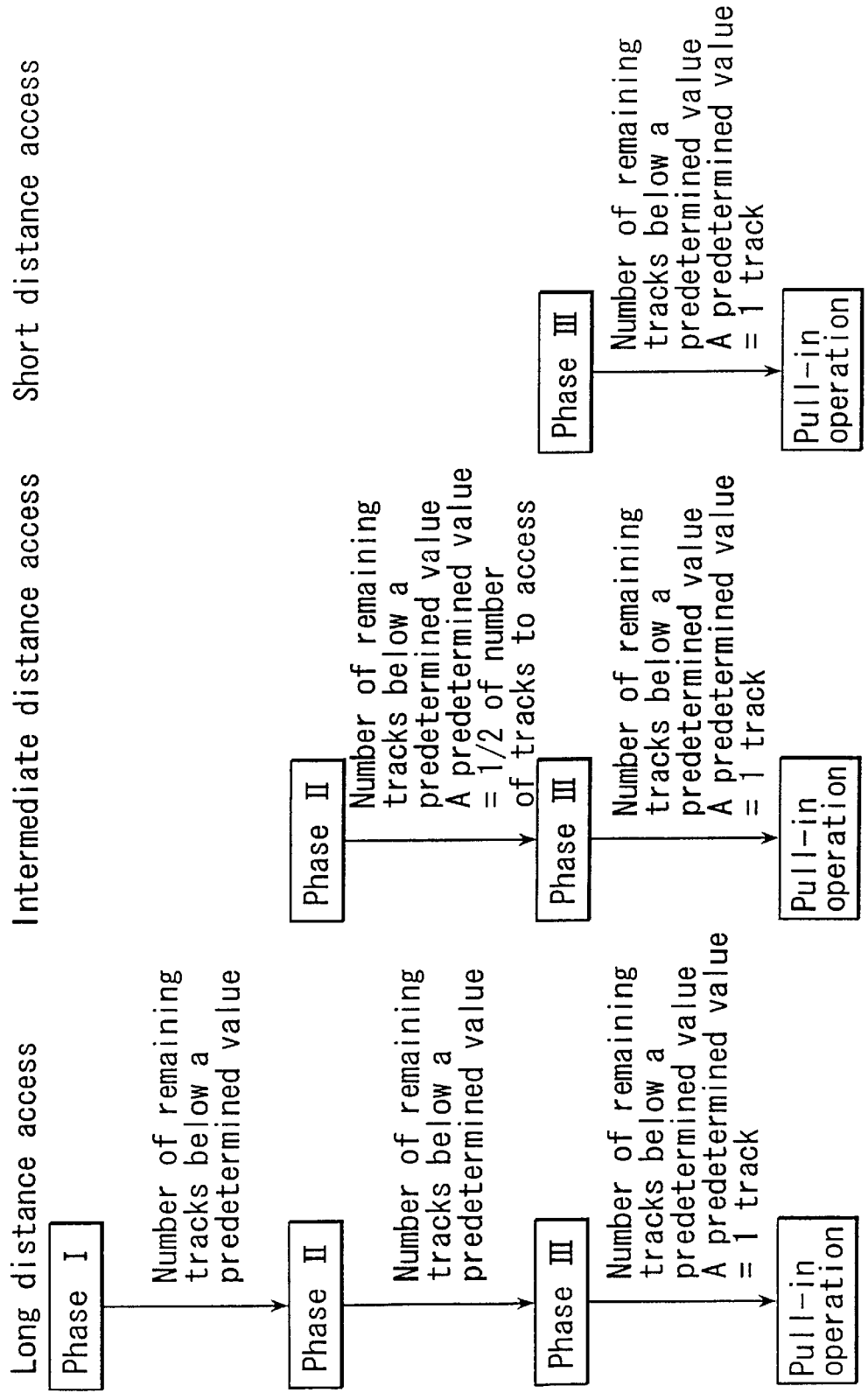
FIG. 4 is a chart showing the phase switching of an access control system of the disk apparatus according the embodiment of the present invention.

As shown in FIG. 4, in a long distance access, the process is controlled to be performed in order of phase I→phase II→phase III, and then transferred to the pull-in operation to the target track is performed. In an intermediate distance access, the process is controlled to be performed in a sequence of phase II→phase III, and then transferred to the pull-in operation to the target track is performed. In a short distance access, the process is controlled to be performed only in phase III, and then transferred to the pull-in operation to the target track is performed.

A very short access of several tracks such as ten tracks or less is performed by a jump, although it is not described here.

The following is the description of the operation in respective phases.

Phase I will be described, at first. In Phase I, when the access to the track over the access distance is a long distance more than the predetermined distance, 1.0 mm for example, the objective lens actuator 21 is not driven at first of the access, and only the feed motor 21 is driven by the coarse positioning mechanism driving circuit 19 on the basis of the output signals of the coarse positioning mechanism moving (absolute) speed detector 18 and the coarse positioning mechanism moving (absolute) distance detector 23. By controlling in this manner, only the optical head 5 is driven in the radial direction of the optical disk 1. AS should be clear from the above, Phase I is the phase for accelerating the optical head towards the target track irrelevant to the relative distance to the target track.

The resolution of the coarse positioning mechanism moving (absolute) distance detector 23 in this time is approximately 80 $\mu$m, and thus the absolute moving speed is also detected just coarsely. At the start of access, the feed motor 20 is accelerated by a large voltage near the maximum voltage to be controlled such that the absolute speed is set at a predetermined value or a value corresponding to an absolute moving distance. The moving distance in this time is detected by the coarse positioning mechanism moving (absolute) distance detector 23, and subtracted from the distance to the target track to be accessed so as to obtain the number of the tracks to the target track. The resolution of the coarse positioning mechanism moving (absolute) distance detector 23 is so poor, and thus the precise positioning on the target track cannot be performed in this phase I.

Figure 13:
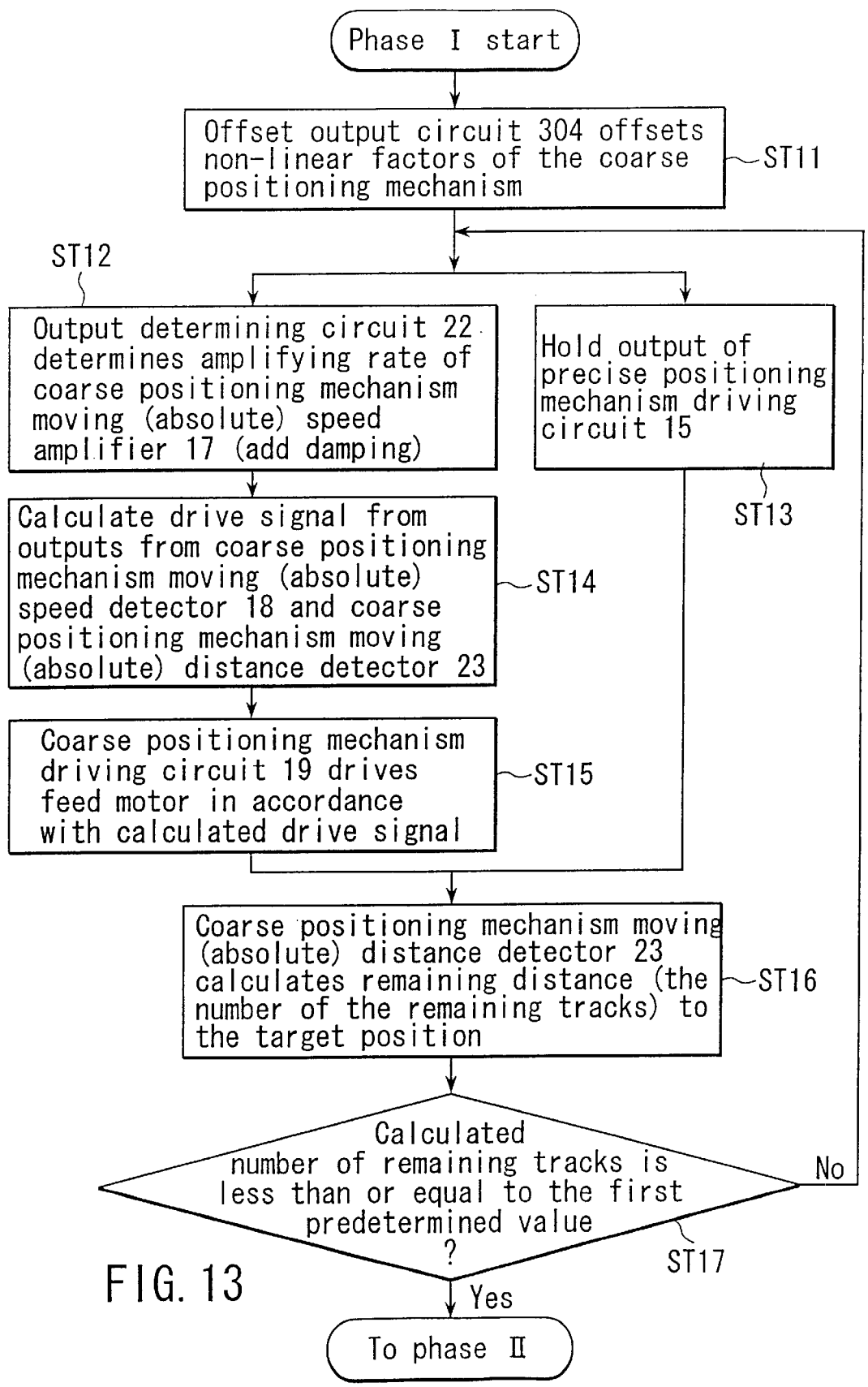
FIG. 13 is a flow chart explaining phase I indicated in FIG. 4.

Phase I will be described more specifically with reference to the flow chart of FIG. 13.

The offset output circuit 304 makes the displacement of the coarse positioning mechanism 20 in the access direction prior to the access, and compensates for the non-linear factors of the coarse positioning mechanism 20, which may be generated in the tracking state (ST 11).

Next, the output determining circuit 22 determines the amplifying rate of the coarse positioning mechanism moving (absolute) speed amplifier 17(ST 12). At the same time, the output of the precise positioning mechanism driving circuit 15 is held (ST 13).

Subsequently, the drive signal for driving the coarse positioning mechanism 20 is calculated on the basis of the outputs from the coarse positioning mechanism moving (absolute) speed detector 18, the coarse positioning mechanism moving (absolute) distance detector 23, and the reference absolute speed generator 25 (ST 14). The coarse positioning mechanism driving circuit 19 then drives the feed motor 20 as the coarse positioning mechanism in accordance with the calculated drive signal (ST 15).

Following the above step, the coarse positioning mechanism moving (absolute) distance detector 23 calculates the remaining distance (the number of the remaining tracks) to the target position (ST 16). When the approximate number of the remaining tracks equals the first predetermined value or less (ST 17, "Y"), the switch 26 is switched to be connected to the coarse positioning mechanism amplifier 16, and the process is transferred to Phase II. When the approximate number of the remaining tracks is not smaller than the first predetermined value (ST 17, "N"), steps 12–16 are repeatedly executed.

Phase II will be described next. In Phase II, when the access to the track over the access distance is an intermediate distance no more than the predetermined distance, 1.0 mm for example, an operating amount proportional to the output signal of the reference speed generator 11 is input into the coarse positioning mechanism driving circuit 19. Upon receiving the operating amount, the coarse positioning mechanism driving circuit 19 controls to drive the feed motor 20. The objective lens actuator 21 is not driven at the start of access, similar to Phase I. By controlling in this manner, only the optical head 5 is driven in the radial direction of the optical disk 1. As should be clear from the above, Phase II is the phase wherein the feed motor 20 is driven by the drive signal proportional to the reference speed corresponding to the number of the remaining tracks.

Figure 14:
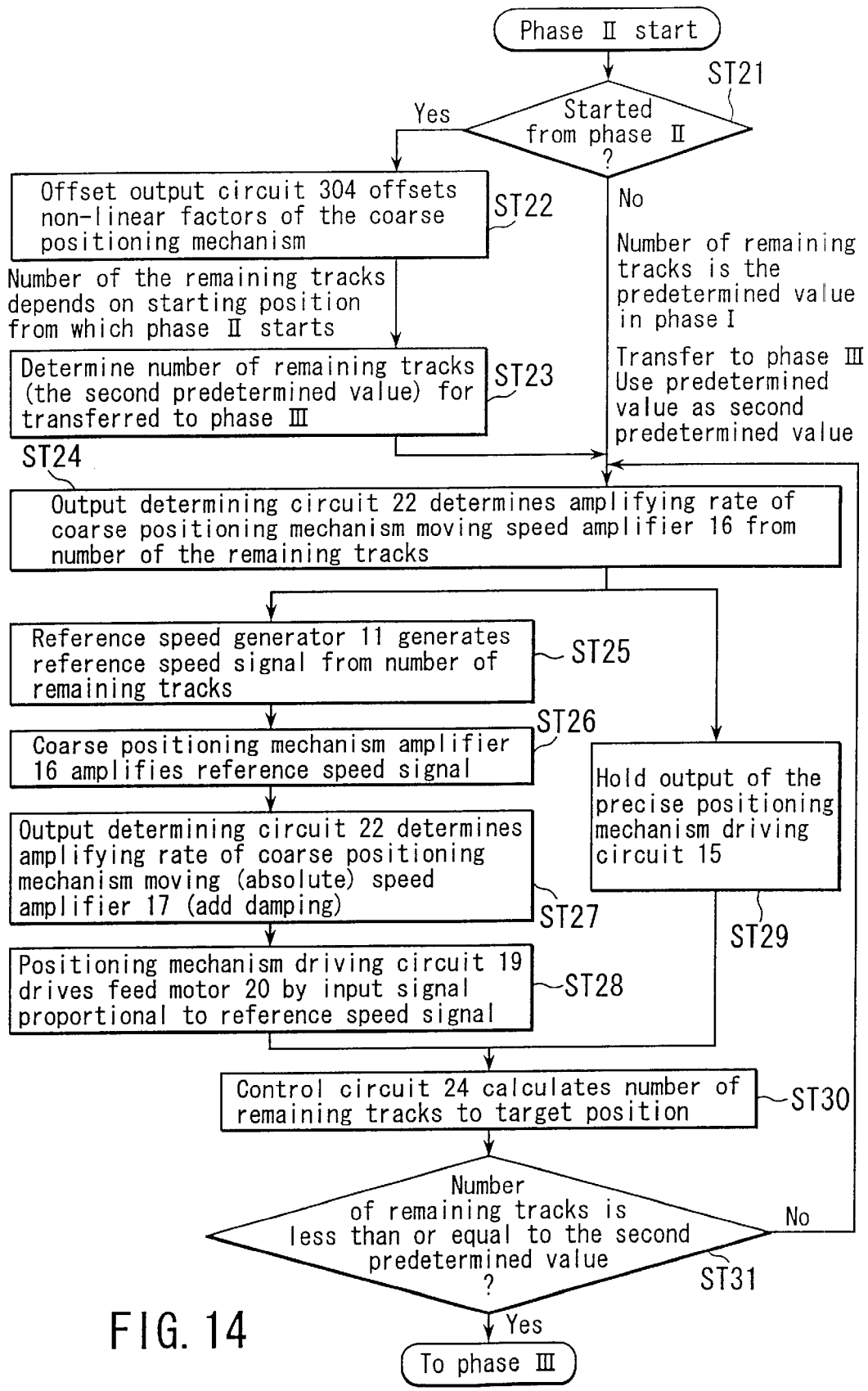
FIG. 14 is a flow chart explaining phase II indicated in FIG. 4.

Phase II will be described more specifically with reference to the flow chart of FIG. 14.

When the seek process is started from Phase II (ST 21, "Y"), the offset output circuit 304 makes the displacement of the coarse positioning mechanism 20 in the access direction prior to the access, and offsets the non-linear elements of the coarse positioning mechanism 20, which may be generated in the tracking state (ST 22). The number of the remaining tracks depends on the starting position from which Phase II starts. The number of the remaining tracks (the second predetermined value) for transfer to Phase III is thus determined on the basis of the starting position of Phase II (ST 23).

On the other hand, when the seek process is not started from Phase II (ST 21, "N"), the number of the remaining tracks corresponds to the first predetermined value in the Phase I. The number of the remaining tracks for transferred to Phase III is thus set as the predetermined value.

Next, the output determining circuit 22 determines the amplifying rate of the coarse positioning mechanism moving speed amplifier 16 on the basis of the number of the remaining tracks when the process is transferred to Phase II (ST 24). More specifically, the output determining circuit 22 changes the gain of the coarse positioning mechanism moving speed amplifier 16 when the number of the remaining tracks equals the predetermined value, 256 for example, or less.

Subsequently, the reference speed generator 11 generates the reference speed signal on the basis of the number of the remaining tracks (ST 25). The output signal is input into the coarse positioning mechanism amplifier 16 temporarily, and amplified at a predetermined amplifying rate (ST 26).

The output determining circuit 22 then determines the amplifying rate of the coarse positioning mechanism moving (absolute) speed amplifier 17 (ST 27). The output signal of the coarse positioning mechanism moving (absolute) speed detector 18 is input into the coarse positioning mechanism moving (absolute) speed amplifier 17 temporarily, and amplified at a predetermined amplifying rate changed by the output determining circuit 22.

Next, the output signal from the coarse positioning mechanism moving speed amplifier 16 is input into the comparator 27 to be compared with the output signal from the coarse positioning mechanism moving (absolute) speed amplifier 17. The output signal from the comparator 27 is input into the coarse positioning mechanism driving circuit 19. The feed motor 20 is driven by the coarse positioning mechanism driving circuit 19 (ST 28).

At the same time, the output of the precise positioning mechanism driving circuit 15 is held (ST 29).

Following to this step, the control circuit 24 calculates the number of the remaining tracks to the target position (ST 30). When the number of the remaining tracks equals the second predetermined value or less (ST 31, "Y"), the process is transferred to Phase III. When the number of the remaining tracks is not smaller than the second predetermined value (ST 31, "N"), steps 24–30 are repeatedly executed.

The transfer from Phase I to Phase II is performed when the number of the remaining tracks becomes the value corresponding to predetermined distance, 1.0 mm for example, or less. The determination of the transfer is executed by the output determining circuit 22 with use of the number of the remaining tracks calculated by the subtraction from the distance to be accessed.

Phase III will be described next. When the optical head 5 moves to the track placed at the mid point of the remaining tracks when the transfer to Phase II is performed, the switch 14 is switched to transfer to Phase III.

Figure 15:
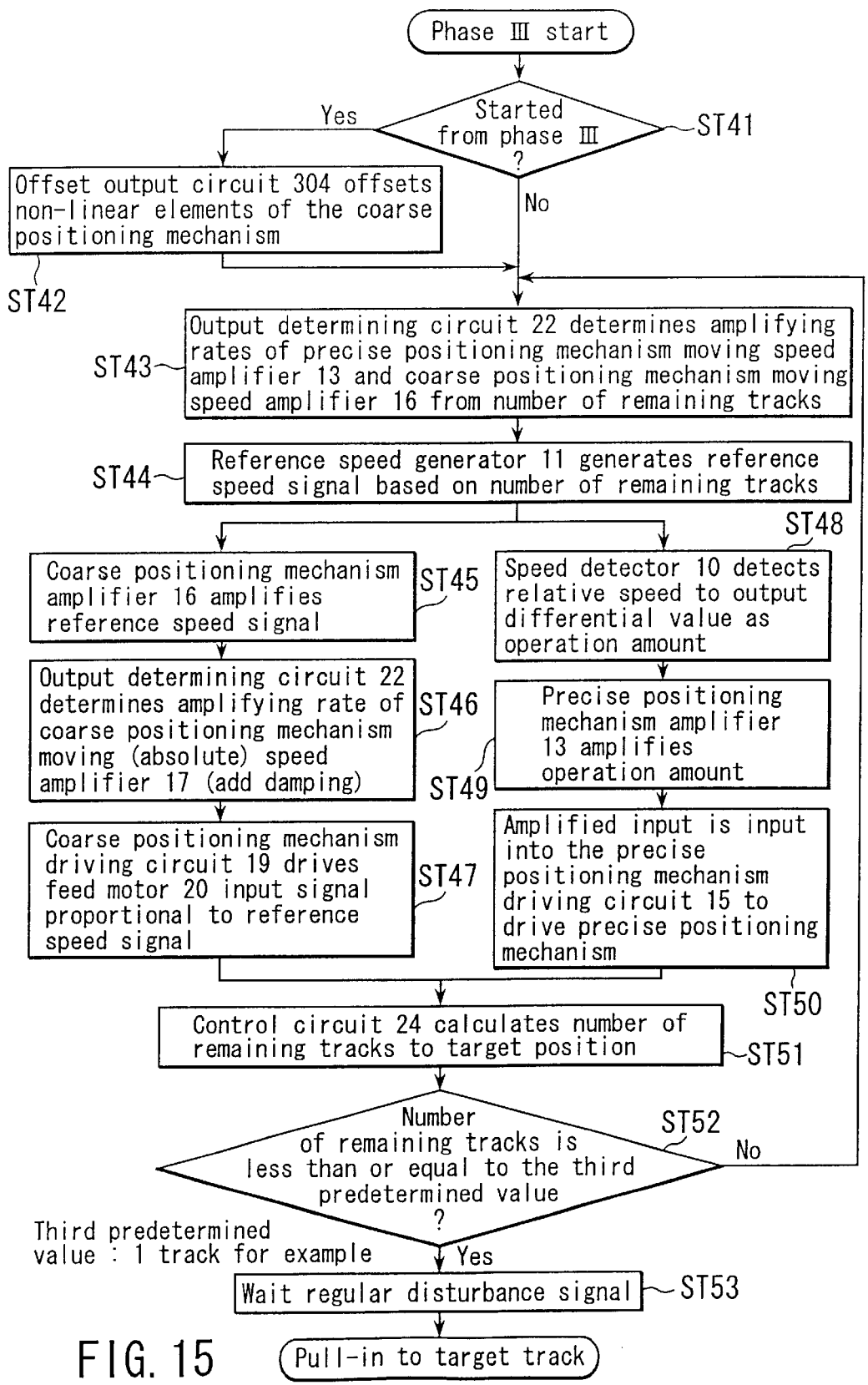
FIG. 15 is a flow chart explaining phase III indicated in FIG. 4.

Phase III will be described more specifically with reference to the flow chart of FIG. 15.

When the seek process is started from Phase III (ST 41, "Y"), the offset output circuit 304 makes the displacement of the coarse positioning mechanism 20 in the access direction prior to the access, and offsets the non-linear factors of the coarse positioning mechanism 20, which may be generated in the tracking state (ST 42).

Next, the output determining circuit 22 determines the amplifying rate of the precise positioning mechanism moving speed amplifier 13 and the coarse positioning mechanism moving speed amplifier 16 on the basis of the number of the remaining tracks (ST 43). Also in the case where the seek process is not started from Phase III (ST 41, "N"), the step ST 43 is executed.

Subsequently, the reference speed generator 11 generates the reference speed signal on the basis of the number of the remaining tracks (ST 44).

The reference speed signal is input into the coarse positioning mechanism amplifier 16 temporarily, and amplified at a predetermined amplifying rate (ST 45).

The output determining circuit 22 then determines the amplifying rate of the coarse positioning mechanism moving (absolute) speed amplifier 17 (ST 46). The output signal of the coarse positioning mechanism moving (absolute) speed detector 18 is input into the coarse positioning mechanism moving (absolute) speed amplifier 17 temporarily, and amplified at a predetermined amplifying rate changed by the output determining circuit 22.

Next, the output signal from the coarse positioning mechanism moving speed amplifier 16 is input into the comparator 27 to be compared with the output signal from the coarse positioning mechanism moving (absolute) speed amplifier 17. The output signal from the comparator 27 is input into the coarse positioning mechanism driving circuit 19. The feed motor 20 is driven by the coarse positioning mechanism driving circuit 19 (ST 47).

The coarse positioning mechanism driving circuit 19 drives the feed motor 20 upon receiving the operation amount proportional to the output signal of the reference speed generator 11, in this manner.

On the other hand, the reference speed signal output from the reference speed generator 11 is input into the comparator 28 to be compared with the relative speed detected by the speed detector 10 (ST 48). The output signal from the comparator 28 is input into the precise positioning mechanism amplifier 13 to be amplified at a predetermined amplifying rate (ST 49).

Subsequently, the output signal from the precise positioning mechanism amplifier 13 is input into the precise positioning mechanism driving circuit 15. The objective lens actuator 21 as the precise positioning mechanism is driven by the coarse positioning mechanism driving circuit 15 (ST 50).

In this manner, the operation amount proportional to the differential value between the relative speed detected by the speed detector 10 and the reference speed output from the reference speed generator 11 is input into the precise positioning mechanism driving circuit 15. The precise positioning mechanism driving circuit 15 drives the objective lens actuator 21 thereby. The relative speed to the target track is the addition of the relative speed of the objective lens actuator 21 and the relative speed of the feed motor 20. The objective lens actuator 21 functions to adjust the relative speed so as to equal the reference speed.

Following this step, the control circuit 24 calculates the number of the remaining tracks to the target position (ST 51). When the number of the remaining tracks equals the third predetermined value or less (ST 52, "Y"), the pull-in control to the target track is performed after the regular input of the disturbance signal (ST 53). When the number of the remaining tracks is not smaller than the second predetermined value (ST 52, "N"), steps 43–51 are repeatedly executed.

As described above, the speed of the optical head 5 in Phase III is controlled by the cooperation of the objective lens actuator 21 and the feed motor 20.

Finally, when the distance to be accessed is equal to or less than the predetermined short distance, e.g., the number of the remaining tracks is 64, Phase III is executed without Phases I and II, to control the access operation by the cooperation of the objective lens actuator 21 and the feed motor 20. The distance is so short that only the objective lens 3 can access the target track by driving the objective lens actuator 21, in some cases. In this embodiment, however, the feed motor 20 is used to help the objective lens actuator 21 in order to possibly suppress the shift of the objective lens 3.

The transfer of the phases is advantageous as described below with reference to the access to intermediate distance or less.

In Phase II, the reference speed generator 11 also functioning as the driving signal generator generates the drive signal of the coarse positioning mechanism 20 at the same time as the access. The drive signal is input into the coarse positioning mechanism amplifier 16 to be amplified at a predetermined amplifying rate controlled by the output determining circuit 22. The output signal from the coarse positioning mechanism amplifier 16 is input into the comparator 27 to be compared with the output signal from the coarse positioning mechanism moving (absolute) speed detector 18. More specifically, the output signal from the coarse positioning mechanism moving (absolute) speed detector 18 such as the motor encoder or the motor rotation speed detector is added as a damping element by the coarse positioning mechanism moving (absolute) speed amplifier 17. The output signal from the comparator 27 is input into the coarse positioning mechanism driving circuit 19.

Since the coarse positioning mechanism 20 may be made to be difficult to displace due to the non-linear factors such static friction of the driving mechanism and the transmission mechanism at the start of access, a rather larger kick pulse signal or the like is input.

Subsequently, the coarse positioning mechanism driving circuit 19 drives the feed motor 20 by the drive signal generated by the reference speed generator 11 also functioning as a drive signal generator.

On the other hand, the differential value between the reference speed output from the reference speed generator 11 and the speed detected by the speed detector 10 is input into the precise positioning mechanism amplifier 13 to be amplified at the predetermined amplifying rate controlled by the output determining circuit 22. The output from the precise positioning mechanism amplifier 13 is input into the precise positioning mechanism driving circuit 15. The precise positioning mechanism driving circuit 15 executes the processing on the basis of the input signal to drive the precise positioning mechanism 21. The precise positioning mechanism 21 is displaced thereby to control the optical spot on the optical disk 1.

By constituting the apparatus in this manner, the drive signal supplied to the coarse positioning mechanism 20 can be maintained at a large value even if the relative moving distance is decreased. As a result, the coarse positioning mechanism 20 can continue to move near the target track.

When the number of the remaining tracks to the target track equals the predetermined value or less, the output determining circuit 22 executes the transfer to Phase III. When the transfer is determined, the input proportional to the difference between the relative speed and the reference speed is supplied to the precise positioning mechanism 21. Although the coarse positioning mechanism 20 moves at a different speed from the reference speed, the precise positioning mechanism 21 is driven to compensate for the difference.

The actual difference between the moving speed of the coarse positioning mechanism 20 and the reference speed is not so large, and thus the precise positioning mechanism 21 is driven smoothly.

In addition, the coarse positioning mechanism 20 continues to move without sudden stop even after the coarse positioning mechanism 20 approaches the target track in the Phase III, and thus the precise positioning mechanism 21 can pull-in the target track without a sudden large displacement. As a result, the shift of the objective lens 3 can be suppressed.

It should be noted that the absolute speed of the precise positioning mechanism 21 should be controlled to decrease at some extent near the target track. At this time, it is most important that the displacement of the precise positioning mechanism 21 is suppressed, and the coarse positioning mechanism 20 may pass through the target track. The other adjustment can be also attained wherein the output determining circuit 22 sets the gain of the amplifier suitably to suppress the shift of the object lens 3.

By employing the control system having the above-mentioned constitution, the reference speed may be also set at a specific level. More specifically, since the coarse positioning mechanism 20 is driven by the voltage and the electric current input via the coarse positioning mechanism driving circuit 19, it is controlled in the form near the open control by generating the absolute acceleration.

On the other hand, the precise positioning mechanism 21 is controlled at the relative speed to the target track. In other words, the coarse positioning mechanism 20 and the precise positioning mechanism 21 are controlled such that the addition of the coarse positioning mechanism 20 and the precise positioning mechanism 21 corresponds to the reference speed.

At this time, it is not preferable that the reference speed near the final target track is much lower than the eccentric speed of the track, which is generated by the eccentricity of the optical disk 1. In order to decrease the reduction in speed, the reference speed near the final target track is preferably set higher than the eccentric speed.

More specifically, the reference speed at the final target track is preferably set higher than a half of the eccentric speed (Re×2×π×fm) calculated using the estimated maximum eccentric amount Re and the highest disk rotation frequency fm, more preferably, 15 mm/s. By setting the final reference speed at such a higher level, an access with remarkably high speed can be attained.

Further, since the final reference speed sets at a relatively higher level in the access operation when the access control state is transferred to the tracking state again, and the access operation may be easily affected by the disturbance elements. It is known that a specific disturbance element such as a header signal is regularly inserted into the tracking error signal in an optical disk such as a DVD-RAM, for example. The regularly inserted disturbance element is used for the access control in such a way that the disturbance element is detected by using the tracking error signal, a signal as the total sum of the signals detected by the photodetector 6, or a signal as the total sum of the signals detected by a focus (or track) detecting photodetector, and the access operation is stopped, to access the target track when the disturbance element is detected. By controlling the access operation in this manner, more stable access control can be attained. The state of the optical apparatus is transferred from the access control state to the tracking state shown in FIG. 9 after the access to the target track.

Figure 11:
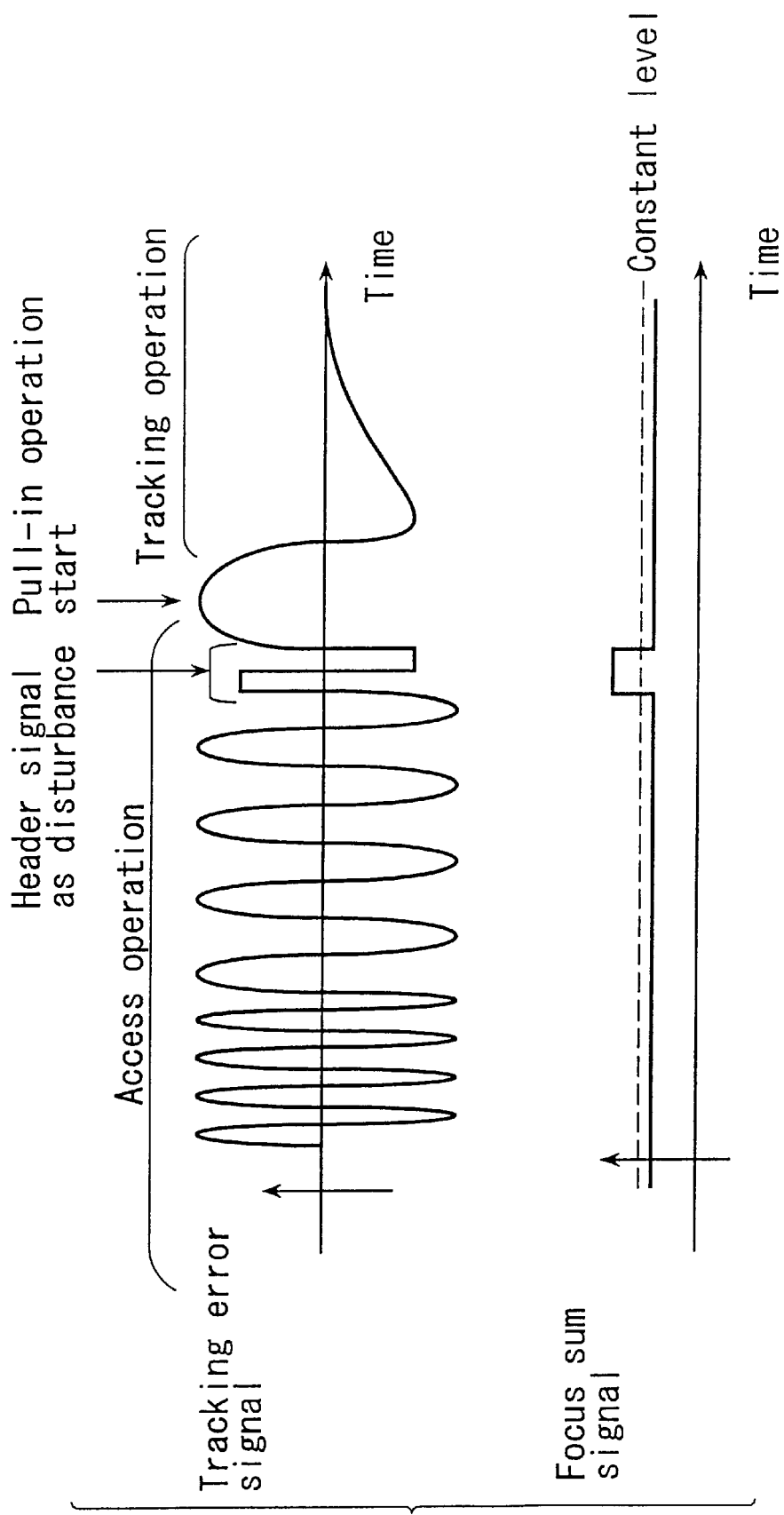
FIG. 11 is a block diagram showing an example of the transfer to the pull-in operation to the optical disk apparatus according to the first embodiment of the present invention.

FIG. 11 shows an example of the transfer. The disturbance signal is detected by the signal as the total sum of the signals detected by a focus detecting photodetector, for example. The temporary increase in the total sum of the signals is detected with use of a slicer for detecting the increase exceeding the normal level, or the like. The detection can be performed when the seek speed is reduced to a some extent, and it can be found that the disturbance signal such as a header signal is inserted into the tracking error signal from the detection result. The header signal is generated a predetermined number of times at regular intervals. It can thus prevent the influence of the header signal in the access operation immediately after the detection of the header signal, more specifically, after several 100 µs.

Figure 12:
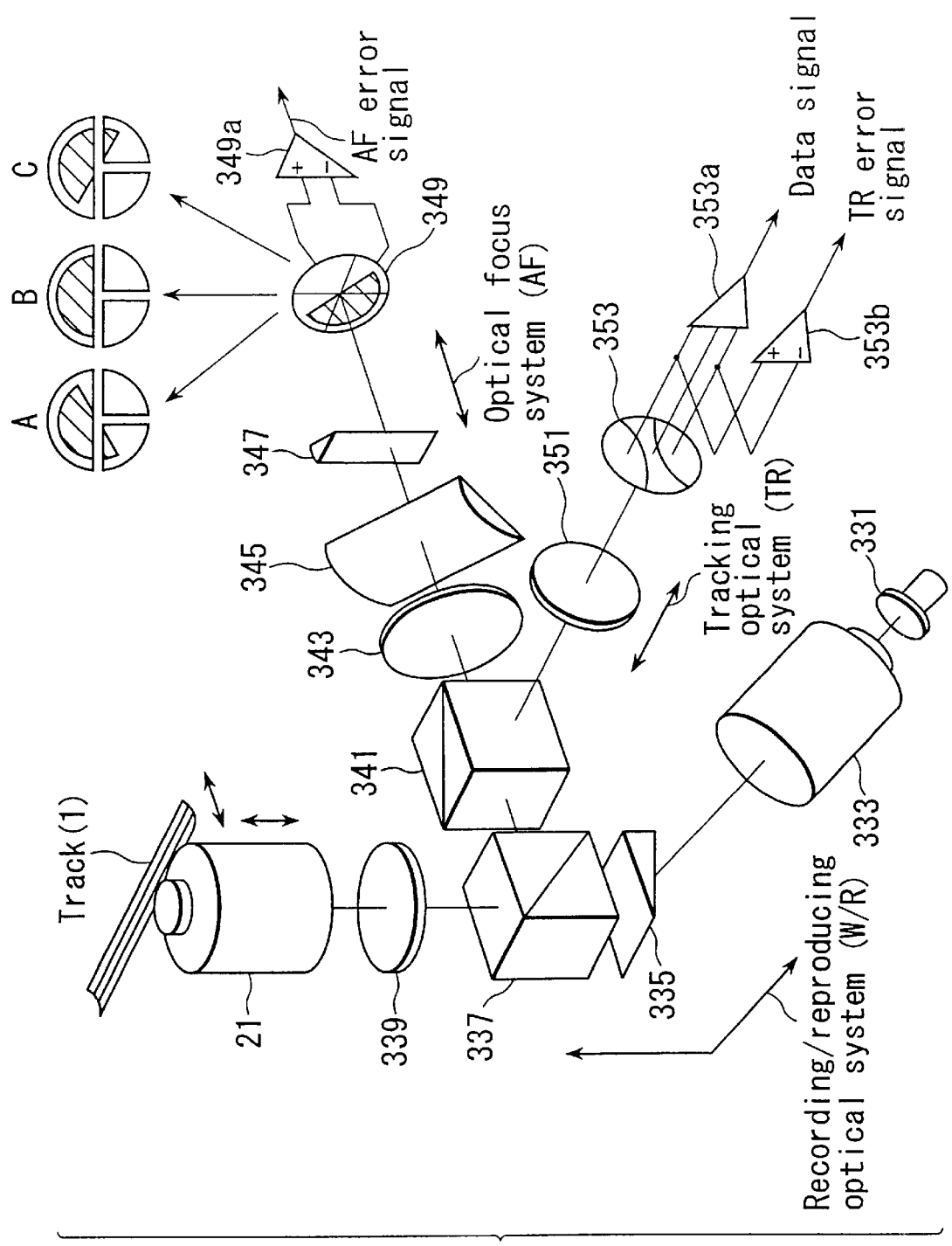
FIG. 12 is an explanatory drawing for explaining an example of the detection of a header signal with use of a focus detection photodetector of the optical disk apparatus according to the first embodiment of the present invention.

Forming of focus sum signal, focus difference signal, track sum signal, and track difference signal will be explained below with reference to a constitution of FIG. 12.

Laser light emitted from a semiconductor laser diode 331 is shaped into round collimate light by a coupling 333 and a beam shaping prism 335, and incident into a polarizing beam splitter 337. The incident light from the laser diode 331 passes through the polarizing beam splitter, and is incident into a focus lens 21 through a quaternary wave plate 339. The focus lens 21 forms a focus spot on a desired track on an information recording layer.

The focus spot is reflected by the information recording layer. The reflection light passes through the focus lens 21 again, and then is incident on the quaternary wave plate 339. The reflection light passes through the quaternary wave plate 339 twice, i.e., before focusing on the information recording layer and after reflected by the information recording layer. The polarized face of the reflection light is changed so as to differ from that of the incident light not passing through the quaternary wave plate 339. Accordingly, the reflection light is reflected by the polarizing beam splitter and is incident on a beam splitter 341. The beam splitter 341 splits the incident reflection light into two directions for the focus detection and the tracking detection.

The light for the tracking detection is incident into a focus lens 351, and then focused on a two-divided photodetector 353. The two-divided photodetector 353 converts the light amount corresponding to the focused pattern into voltage. The voltage signals corresponding to the light amount are output to addition/subtraction calculators 353a and 353b. One detected as difference of the two-divided photodetector is a track difference signal, and one detected as sum thereof is a track sum signal. The track sum signal is proportional to the reflection light from the information recording layer.

The light for the focus detection is incident into a focus lens 343, passes through a cylindrical lens 345 and a knife edge 347, and then focused on a three-divided photodetector 349. A pattern of the light on the three-divided photodetector 349 is changed depending on a focusing condition of the light, such as A, B, and C shown in the drawing. In the optimum focusing condition, a pattern B is attained, and in a defocusing condition, patterns A or C are attained. In the optimum focusing condition, an addition/subtraction calculator 349a performs the subtraction of the voltage signals corresponding to the light amounts detected by two of the three-divided photodetector 349 to attain the focus difference signal. The addition/subtraction calculator 349a also attains the focus sum signal by adding voltage signals corresponding to the light amounts detected by all the photodetector. The focus sum signal is proportional to the reflection light from the information recording layer, like as the track sum signal.

The header signal is detected in the following manner, for example. That is, the header section in the optical disk is higher in reflectivity than the other regions on the recording layer, and thus the level of the focus sum signal from the header section is higher than the level of the signal from the other regions. The header signal can be detected in this manner.

Figure 5:
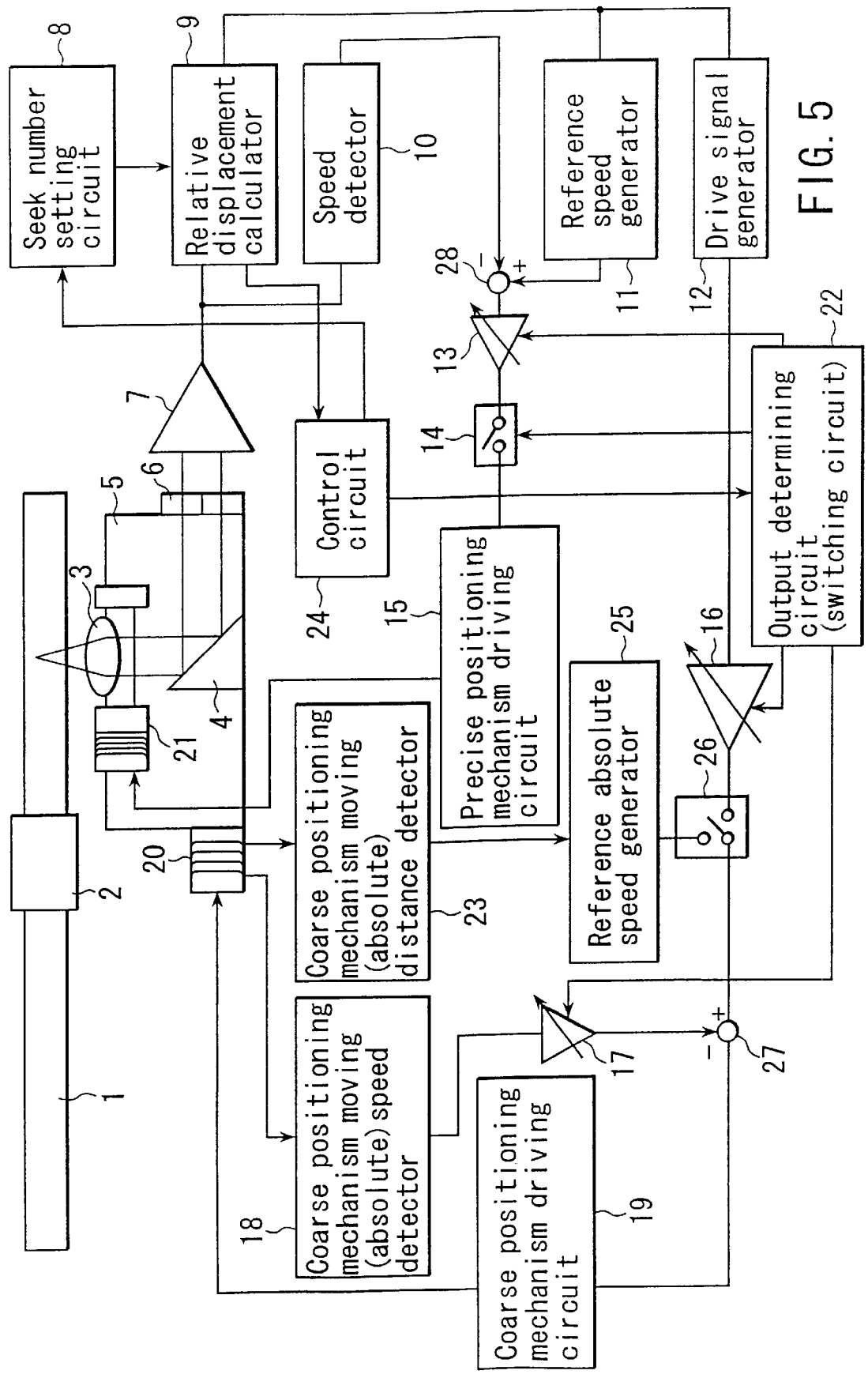
FIG. 5 is a block diagram showing another example of the constitution of the control system of an optical disk apparatus according to the first embodiment of the present invention.

In the above-mentioned embodiment, an easy method wherein the reference speed generator 11 functions also as the drive signal generator is described. In this case, the memory region in the LSI control device can be efficiently utilized, and thus is remarkably preferable. If the control performance is desired to be increased, the drive signal generator 12 can be provided to correspond to the relative moving distance, without using the reference signal as the drive signal of the coarse positioning mechanism. The block diagram of the control system in this case is shown in FIG. 5.

The drive signal generator 12 may be constituted as a circuit for outputting a drive signal with reference to a table of drive signals in response to the relative moving distance, or may be a circuit for determining the output drive signal by the calculation such as function. In another case, the circuit may be a circuit having a plurality of tables and functions such that the drive signal corresponding to the seek distance is referred to in order to prevent an unstable condition due to the seek distance, as described above.

In Phase I and Phase II, it is more effective to take means such to short circuit a driving coil, in addition to the inhibition of the use of the objective lens actuator in order to prevent undesirable vibration.

Further, the transfer from Phase I to Phase II may be executed when the detected value of the relative speed is equal to or less than a predetermined value, 0.5 m/s. In Phase II, it is an essential condition that the relative speed can be calculated with the relative displacement calculator 9, that the relative speed can be detected with the speed detector 10, and that the moving speed is set such that the track cross pulse can be detected. Therefore, a stable operation can be attained by setting the apparatus such that the apparatus transfers into Phase II when the relative speed reaches value enable to detect the track cross pulse.

Similarly, the apparatus can be also constituted without Phase I. In this case, however, it needs to be set to perform the low-speed driving at the start of access such that the relative displacement calculator 9 and the speed detector 10 can perform the operation, or to enhance the performance of the detector so as to enable the high-speed detection.

In order to prevent the occurrence of unstable factors due to the seek distance, it is also effective to change the gain of the precise positioning mechanism 21. This is because, the access control is attained by the gain ratio of the precise positioning mechanism 21 and the coarse positioning mechanism 20 to take a balance thereof. When the coarse positioning mechanism 20 makes too large a displacement, the excess displacement of the coarse positioning mechanism 20 can be suppressed by increasing the gain of the precise positioning mechanism 21.

It should be noted that the excess displacement of the precise positioning mechanism 21 should be avoided.

The precise positioning mechanism 21 used in this embodiment may be an actuator for moving a lens or a mirror. With use of a mirror as the precise positioning mechanism 21, the lens shift due to the shift of the objective lens 3 from the optical axis will not occur. It is known, however, that the same problem will occur in a photodetector when the optical axis is inclined by a mirror.

Figure 10:
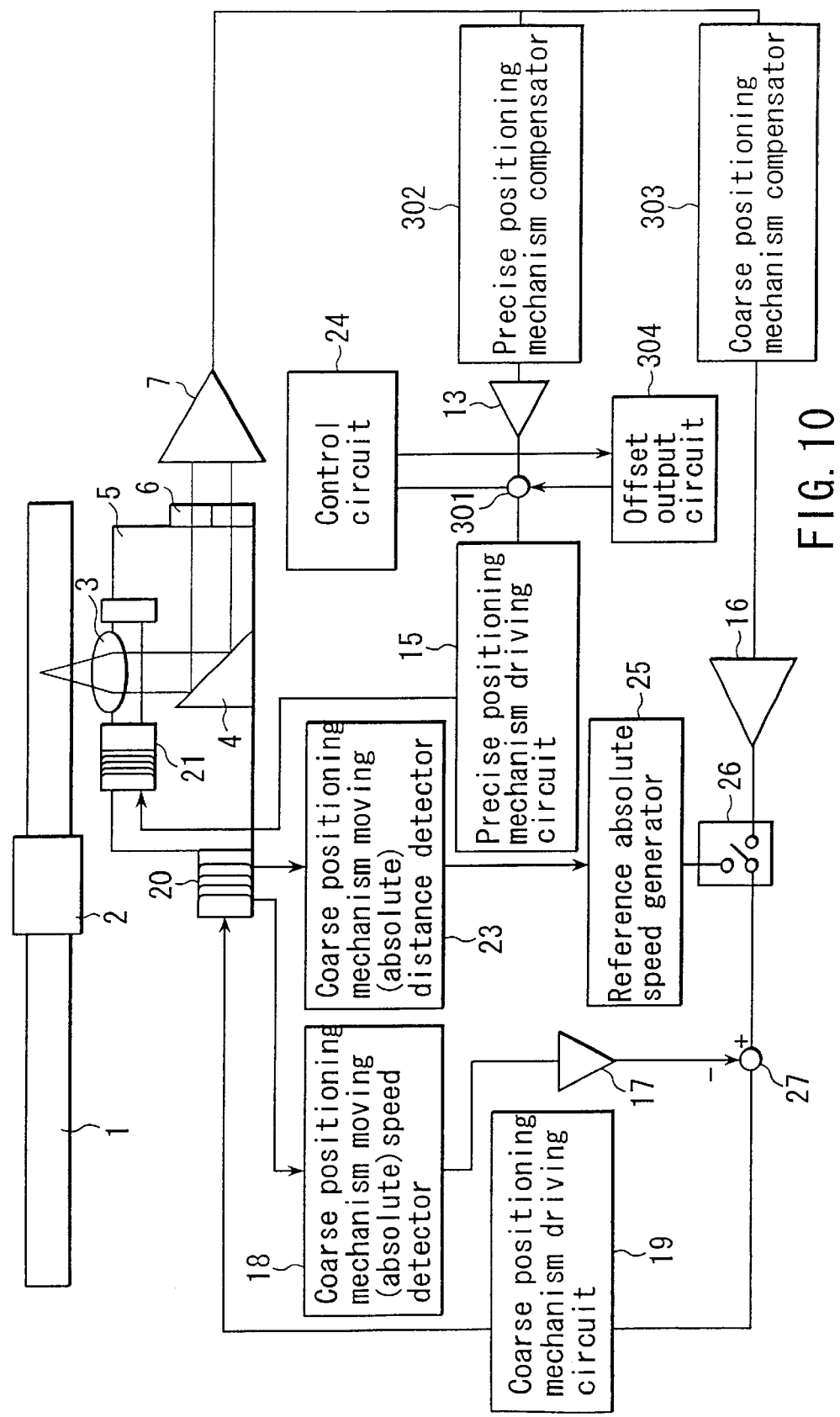
FIG. 10 is a block diagram showing another example of the constitution of the control system of an optical disk apparatus according to the first embodiment of the present invention.

FIG. 9 shows the constitution of the control system during the tracking operation immediately before the start of the access. This control system may be constituted as shown in FIG. 10 to which an offset output for displacing the precise positioning mechanism in the opposite direction to that of the access is arranged. In this case, the opposite displacement to that of the access is attained by the offset output. At the same time, the apparatus is in the tracking operation, and thus the coarse positioning mechanism 20 displaces so as to compensate the displacement of the precise positioning mechanism 21. As a result, the coarse positioning mechanism 20 displaces in the access direction to attain a similar effect.

The coarse positioning mechanism 20 may be any of a DC motor, a stepping motor, a linear motor, and voice coil motor, and may include another driving force transmission mechanism.

[Second Embodiment]

Figure 6:
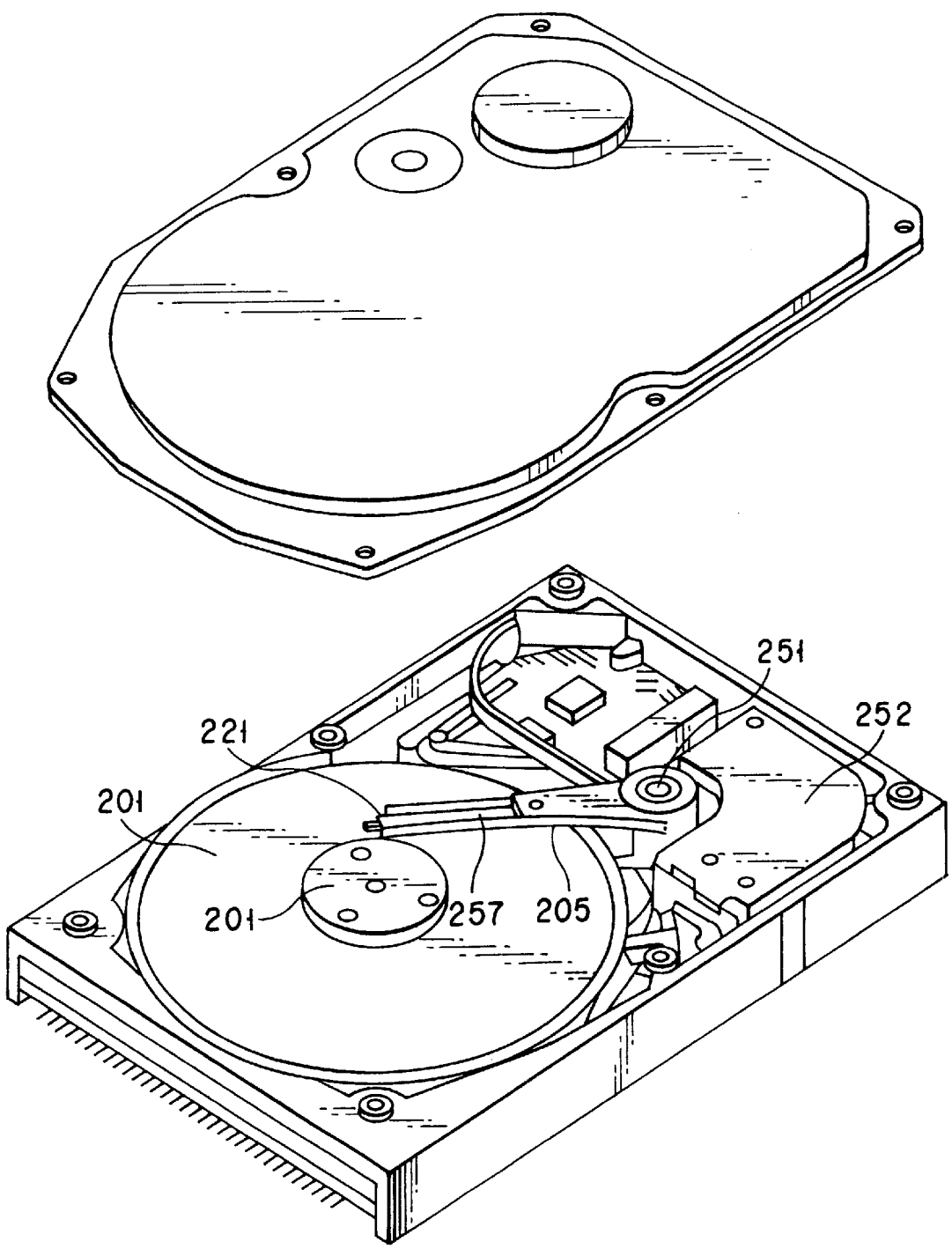
FIG. 6 is a schematic view showing an example of the constitution of the hard disk apparatus according to the second embodiment of the present invention.
Figure 7:
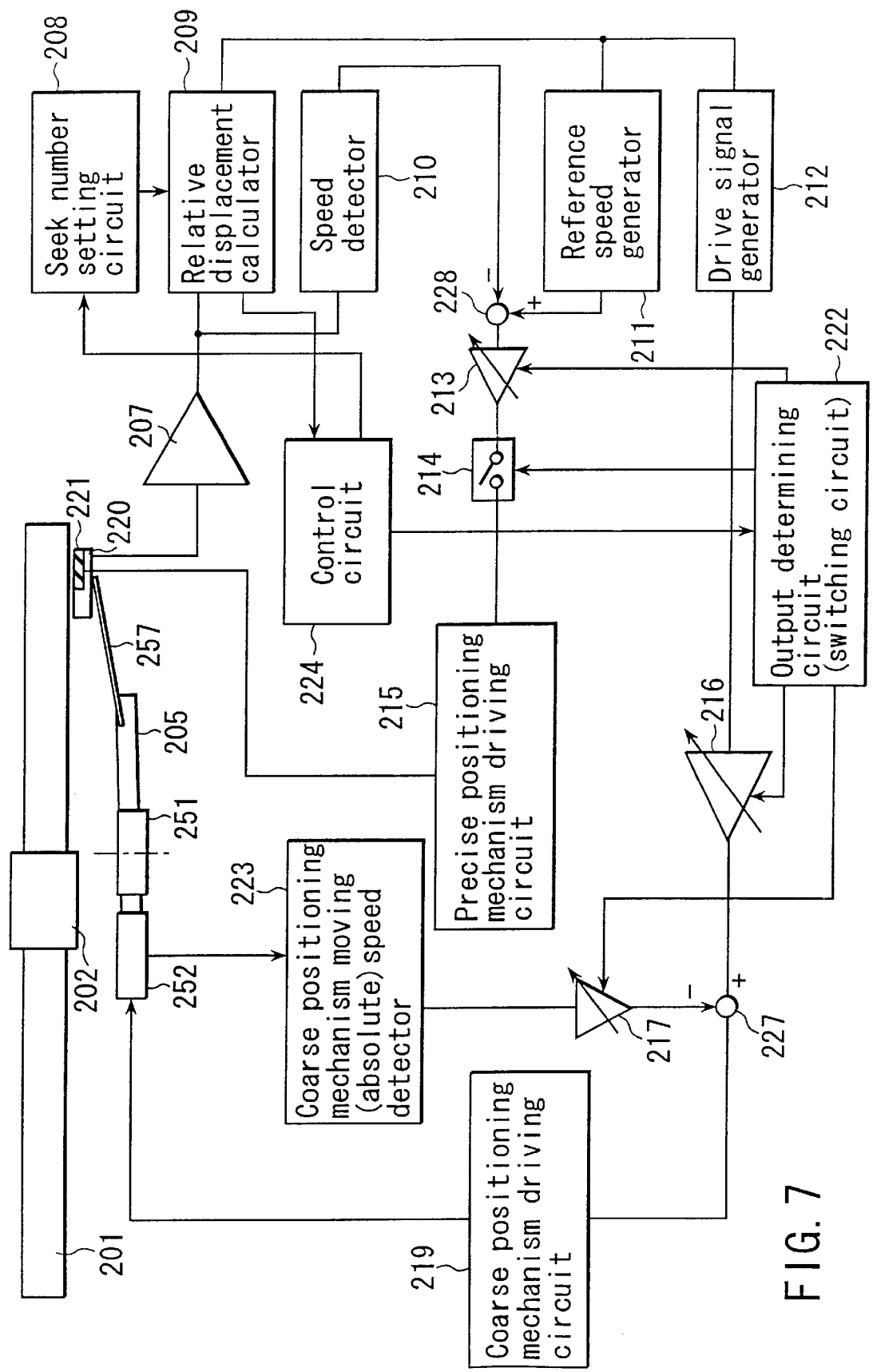
FIG. 7 is a block diagram showing another example of the constitution of the control system of the hard disk apparatus shown in FIG. 6.
Figure 8:
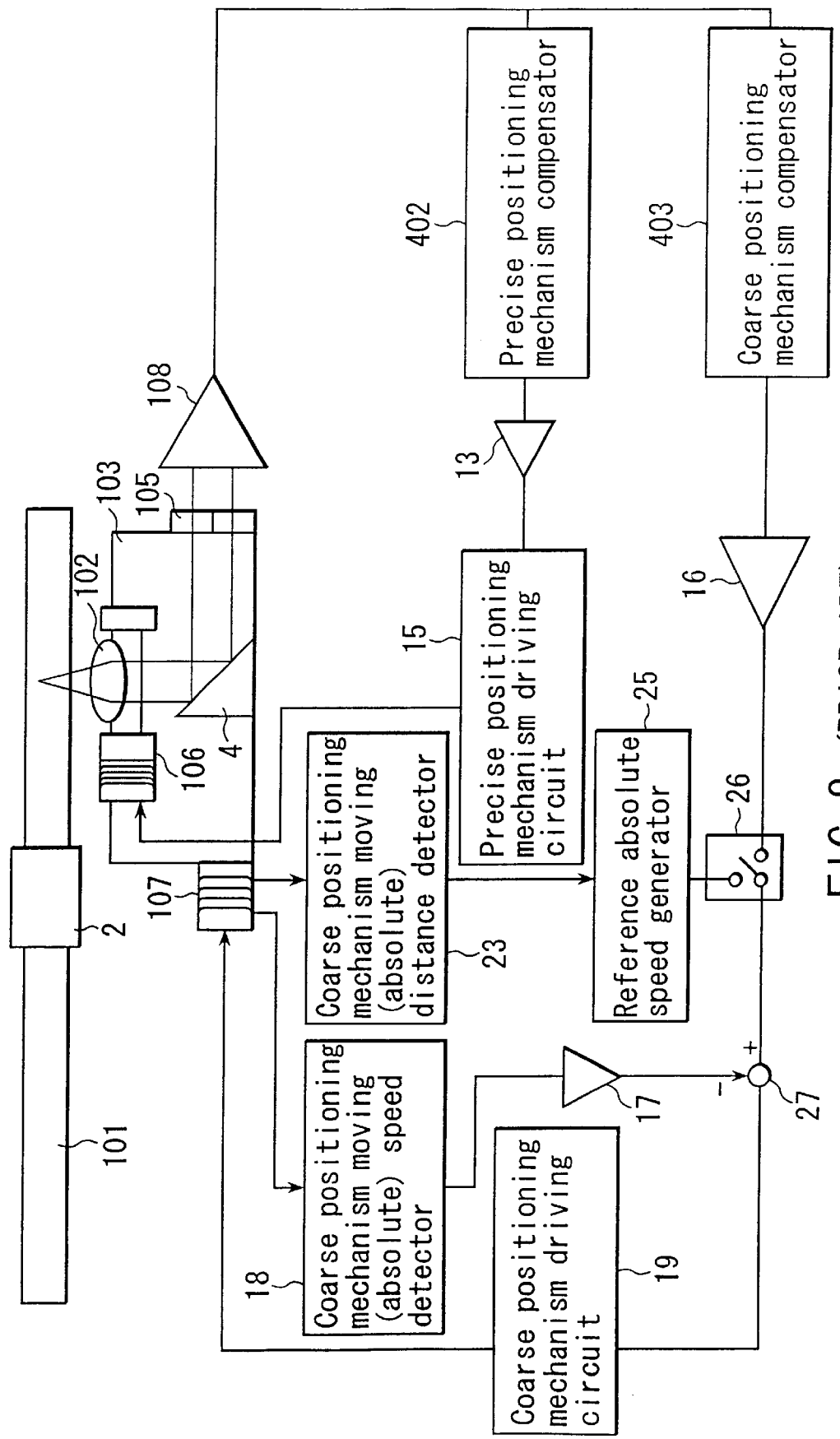
FIG. 8 is a block diagram showing an example of the constitution of the control system of the conventional optical disk apparatus.

FIG. 7 is a block diagram showing the main elements of the access control system of the disk apparatus according to the second embodiment of the present invention, which is applied to the access control system of a hard disk drive apparatus (HDD). FIG. 6 is a schematic view of the hard disk drive apparatus according to the second embodiment of the present invention.

The hard disk drive apparatus shown in FIGS. 6 and 7 comprises a head section (information recording/reproducing section) 220, a coarse positioning mechanism 252, and a precise positioning mechanism 221. The head section 220 records/reproduces information on a magnetic disk 201 having information recording tracks. The coarse positioning mechanism 252 makes the displacement of a head section 220 so as to position the head section on an entire information recording region in a radial direction of the magnetic disk 201. The precise positioning mechanism 221 makes fine displacement of the head section 220 in a radial direction of the magnetic disk 201.

The read signal read from the magnetic disk 201 rotated at a predetermined rotating speed by a disk motor 202 is input into an amplifier circuit 207 to generate a reproduction signal.

As shown in FIG. 7, the hard disk drive apparatus further comprises a control circuit 224, a seek setting circuit 208, a speed detector 210, a relative displacement calculator 209, a reference speed generator 211, and a drive signal generator 212.

The seek setting circuit 208 sets the number of the seeks on the basis of the control of the control circuit 224. The speed detector 10 detects a moving speed of the head section 220 in the radial direction of the magnetic disk on the basis of the reproduction signal reproduced by the amplifier circuit 207. The relative displacement calculator 209 detects a moving distance of the head section 220 in the radial direction of the magnetic disk. The reference speed generator 211 generates a reference speed based on the moving distance calculated by the relative displacement calculator 209. The drive signal generating circuit 212 generates a drive signal of the coarse positioning mechanism 252 in accordance with the moving distance calculated by the relative displacement calculator 209.

The hard disk apparatus further comprises, in the control system, a coarse positioning mechanism driving circuit 219 and a precise positioning mechanism driving circuit 215. The coarse positioning mechanism driving circuit 219 drives the coarse positioning mechanism 252 on the basis of the drive signal generated by the drive signal generating circuit 212. The precise positioning mechanism driving circuit 215 drives the precise positioning mechanism 221 in accordance with the difference between the speed detected by the speed detector 210 and the reference moving speed generated by the reference speed generator 211.

The hard disk apparatus further comprises a comparator 228 for comparing the output signal of the speed detector 210 and the output signal of the reference speed generator 211, the precise positioning mechanism amplifier 213 for amplifying the output of the comparator 228 at a predetermined amplifying rate, and a switch 214 for switching the output signal from the precise positioning mechanism amplifier 213 to the input terminal of the precise positioning mechanism driving circuit 215.

The switch 214 inhibits the input of the signal to the precise positioning mechanism driving circuit 215 until the output of the relative displacement calculator 209 reaches a predetermined value. The switch 214 also inhibits the input of the signal to the precise positioning mechanism driving circuit 215 until the output signal of the speed detector 210 reaches a predetermined value.

The hard disk apparatus, as shown in FIG. 7, further comprises a coarse positioning mechanism moving (absolute) speed detector 223 for detecting the moving speed of the head section 220 along the radial direction of the magnetic disk.

The hard disk apparatus further comprises a coarse positioning mechanism amplifier 216, a coarse positioning mechanism moving (absolute) speed amplifier 217, a comparator 227, and an output determining circuit 222. The coarse positioning mechanism amplifier 216 amplifies the output of the reference speed generator 211 at a predetermined amplifying rate. The coarse positioning mechanism moving (absolute) speed amplifier 217 amplifies the output of the coarse positioning mechanism moving (absolute) speed detector 223 at a predetermined amplifying rate. The comparator 227 compares the output signal of the coarse positioning mechanism moving (absolute) speed amplifier 217 and the output signal from the coarse positioning mechanism amplifier 216.

The output determining circuit 222 changes the gain of the coarse positioning mechanism amplifier 216 in accordance with the predetermined moving distance. The output determining circuit 222 also changes the gain of the precise positioning mechanism amplifier 213 in accordance with the predetermined moving distance. The output determining circuit 222 further changes the gain of the coarse positioning mechanism moving (absolute) speed amplifier 217 in accordance with the predetermined moving distance. The output determining circuit 222 controls the switching of the switch 214.

The hard disk apparatus shown in FIGS. 6 and 7 employs a voice coil motor 252 as the coarse positioning mechanism. The hard disk apparatus also employs a $\mu$ actuator 221 mounted on a slider 257, as the precise positioning mechanism. The slider 257 is connected to a distal end portion of an arm 205 driven by the voice coil motor 252 in the radial direction of the magnetic disk with respect to a rotation pin 251.

When the thin $\mu$ actuator 221 is employed in this manner, the tolerance is set very small. In general, the slider 257 is formed smaller than 1 mm$^2$, and the $\mu$ actuator 221 formed therein is a very fine one.

The $\mu$ actuator 221 is supported by a supporting system formed of the same material as that of the slider 257, or silicon or the like, to have a high strength. The member with high strength needs a large force to be largely displaced. The actual force generated by the $\mu$ actuator 221 is substantially determined by the area of the electrode as a power source. Therefore, the small slider 257 has the limitation in the force generated by itself.

Accordingly, the displacement of the $\mu$ actuator 221 is limited and it is suitable about 100 nm or less. It is difficult to displace the $\mu$ actuator 221 over the limitation value, and it is thus needed to attain high-speed access while the displacement is limited by the seek control system as shown in FIG. 7.

The access control process according to the second embodiment comprises three phases, similar to the first embodiment. Therefore, according to the second embodiment, the similar advantages to those of the first embodiment can be attained.

More specifically, when the access seek is performed by the cooperation of the precise positioning mechanism and the coarse positioning mechanism in Phase III, the displacement of the precise positioning mechanism is suppressed equal to or less than the predetermined value without a sensor for detecting the relative displacement of the precise positioning mechanism to the coarse positioning mechanism, and the access seek control with high speed can be attained. At this time, even if the apparatus has a low-cost constitution having gears and screws, and backlash and friction, a high-speed and stable access seek control can be attained by continuously applying a large input into the coarse positioning mechanism until the coarse positioning mechanism reaches near the target position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk apparatus comprising:
   information recording/reproducing mechanism which records/reproduces information on a disk having a plurality of information tracks;
   a precise positioning mechanism which finely displaces the information recording/reproducing mechanism in a radial direction of the disk;
   a coarse positioning mechanism which positionally displaces the information recording/reproducing mechanism in an entire information recording region in the radial direction of the disk;
   a speed detector which detects a moving speed of the information recording/reproducing mechanism in the radial direction of the disk in accordance with a signal reproduced by the information recording/reproducing mechanism;
   a displacement calculator which detects a moving distance of the information recording/reproducing mechanism in the radial direction of the disk in accordance with a signal reproduced by the information recording/reproducing mechanism;
   a reference speed generator which generates a reference speed used for controlling the drive of the precise positioning mechanism in accordance with the displacement calculated by the displacement calculator;
   a drive signal generator which generates a drive signal for driving the coarse positioning mechanism in accordance with the displacement calculated by the displacement calculator;
   a coarse positioning mechanism moving speed detector which detects a moving speed of the coarse positioning mechanism along a radial direction of the information recording/reproducing mechanism;
   a coarse positioning mechanism driving circuit which controls the drive of the coarse positioning mechanism in accordance with a difference between the drive signal generated by the drive signal generator and a moving speed detected by the coarse positioning mechanism moving speed detector; and
   a precise positioning mechanism driving circuit which controls the drive of the precise positioning mechanism in accordance with a difference between the moving speed detected by the speed detector and the reference speed generated by the reference speed generator.

2. The disk apparatus according to claim 1, further comprising a switch which cuts off an input of a signal to the precise positioning mechanism driving circuit until an output of the displacement calculator reaches a predetermined value.

3. The disk apparatus according to claim 1, further comprising a switch which cuts off an input of a signal to the precise positioning mechanism driving circuit until an output of the speed detector reaches a predetermined value.

4. The disk apparatus according to claim 1, further comprising:
   a coarse positioning mechanism amplifier which amplifies the drive signal input into the coarse positioning mechanism driving circuit at a predetermined amplifying ratio;
   a moving distance setting circuit which sets the moving distance of the information recording/reproducing mechanism; and
   an output determining circuit which changes a gain of the coarse positioning mechanism amplifier in accordance with the moving distance set by the moving distance setting circuit.

5. The disk apparatus according to claim 1, further comprising:
   a precise positioning mechanism amplifier which amplifies the drive signal input into the precise positioning mechanism driving circuit at a predetermined amplifying ratio;

a moving distance setting circuit which sets the moving distance of the information recording/reproducing mechanism; and an output determining circuit which changes a gain of the precise positioning mechanism amplifier in accordance with the moving distance set by the moving distance setting circuit.

6. The disk apparatus according to claim 1, further comprising:

a coarse positioning mechanism moving speed detector which detects the moving speed of the information recording/reproducing mechanism in the radial direction of the disk;

a coarse positioning mechanism moving speed amplifier which amplifies an output signal from the coarse positioning mechanism moving speed detector at a predetermined amplifying ratio;

a moving distance setting circuit which sets the moving distance of the information recording/reproducing mechanism; and an output determining circuit which changes a gain of the coarse positioning mechanism moving speed amplifier in accordance with the moving distance set by the moving distance setting circuit.

7. The disk apparatus according to claim 1, wherein the reference speed generator includes the drive signal generator.

8. The disk apparatus according to claim 1, wherein the coarse positioning mechanism is constituted by a motor and a driving force transmission mechanism, further comprising an offset output circuit for displacing the coarse positioning mechanism in a predetermined direction.

9. The disk apparatus according to claim 1, wherein the reference speed generated by the reference speed generator is more than half of an eccentric speed near a target track.

10. The disk apparatus according to claim 1, wherein the reference speed is more than 15 mm/s near a target track.

11. The disk apparatus according to claim 1, wherein the precise positioning mechanism is controlled to be driven by the difference between the detected speed and the reference speed until a disturbance signal regularly inserted into a track traversing signal passes through.

12. The disk apparatus according to claim 1, further comprising disturbance signal detecting mechanism which detects the disturbance signal, the disturbance signal detecting mechanism detecting the disturbance signal in accordance with a level of a focus or track sum signal corresponding to a total sum of a reflected light of an optical spot incident on the disk.

13. A disk apparatus comprising:

optical spot forming mechanism which forms an optical spot on an optical disk having a plurality of information tracks;

a precise positioning mechanism which finely displaces the information recording/reproducing mechanism in a radial direction of the disk;

a coarse positioning mechanism which positionally displaces the optical spot in an entire information recording region in the radial direction of the disk;

a precise positioning mechanism driving circuit which receives a track traversing signal generated when the optical spot traverses one of the information tracks, and positions the optical spot on the one of the information tracks;

a precise positioning mechanism comparator which calculates the input signal to the precise positioning mechanism driving circuit from the track traversing signal;

a coarse positioning mechanism driving circuit which receives the track traversing signal, which positions the optical spot on the one of the information tracks;

a coarse positioning mechanism comparator which calculates the input signal to the coarse positioning mechanism driving circuit from the track traversing signal;

a control circuit which cancels an operation of positioning the optical spot on the one of the information tracks, and judges a movement for an operation of traversing the track in a predetermined direction; and an offset output circuit which adds to a coarse positioning mechanism drive signal an offset output for displacing the coarse positioning mechanism in the predetermined direction on the basis of a judging result of the control circuit.

14. A disk apparatus comprising:

optical spot forming mechanism which forms an optical spot on an optical disk having a plurality of information tracks;

a precise positioning mechanism which finely displaces the information recording/reproducing mechanism in a radial direction of the disk;

a coarse positioning mechanism which positionally displaces the optical spot in an entire information recording region in the radial direction of the disk;

a precise positioning mechanism driving circuit which receives a track traversing signal generated when the optical spot traverses one of the information tracks, and positions the optical spot on the one of the information tracks;

a precise positioning mechanism comparator which calculates the input drive signal to the precise positioning mechanism driving circuit from the track traversing signal;

a coarse positioning mechanism driving circuit which receives the track traversing signal, and positions the optical spot on the one of the information tracks;

a coarse positioning mechanism comparator which calculates the drive input signal to the coarse positioning mechanism driving circuit from the track traversing signal;

a control circuit which cancels an operation of positioning the optical spot on the one of the information tracks, and judges a movement to an operation of traversing the track in a predetermined direction; and an offset output circuit which adds to a precise positioning mechanism drive signal an offset output for displacing the coarse positioning mechanism in an opposite direction to the predetermined direction on the basis of a judging result of the control circuit.

15. A disk apparatus comprising:

information recording/reproducing mechanism which records/reproduces information on a disk having a plurality of information tracks;

a precise positioning mechanism which finely displaces the information recording/reproducing mechanism in a radial direction of the disk;

a coarse positioning mechanism which positionally displaces the information recording/reproducing mechanism in an entire information recording region in the radial direction of the disk;

a speed detector which detects a moving speed of the information recording/reproducing mechanism in the radial direction of the disk in accordance with a signal reproduced by the information recording/reproducing mechanism;

a displacement calculator which detects a moving distance of the information recording/reproducing mechanism in the radial direction of the disk in accordance with a signal reproduced by the information recording/reproducing mechanism;

a reference speed generator which generates a reference speed used for controlling the drive of the coarse positioning mechanism and the precise positioning mechanism in accordance with the displacement calculated by the displacement calculator;

a coarse positioning mechanism moving speed detector which detects a moving speed of the coarse positioning mechanism along a radial direction of the information recording/reproducing mechanism;

a coarse positioning mechanism driving circuit which controls the drive of the coarse positioning mechanism in accordance with a difference between the reference speed generated by the reference speed generator and a moving speed detected by the coarse positioning mechanism moving speed detector; and a precise positioning mechanism driving circuit which controls the drive of the precise positioning mechanism in accordance with a difference between the moving speed detected by the speed detector and the reference speed generated by the reference speed generator.

* * * * *